US009197689B2

(12) United States Patent
Ha et al.

(10) Patent No.: US 9,197,689 B2
(45) Date of Patent: Nov. 24, 2015

(54) METHOD AND APPARATUS FOR ADAPTIVELY STREAMING CONTENT INCLUDING PLURALITY OF CHAPTERS

(75) Inventors: Ho-jin Ha, Suwon-si (KR); Soon-back Cha, Hwaseong-si (KR); Ji-eun Keum, Suwon-si (KR); O-hoon Kwon, Suwon-si (KR); Hyung-tak Choi, Suwon-si (KR); Sun-bal Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 13/051,514

(22) Filed: Mar. 18, 2011

(65) Prior Publication Data

US 2011/0231520 A1 Sep. 22, 2011

Related U.S. Application Data

(60) Provisional application No. 61/439,985, filed on Feb. 7, 2011, provisional application No. 61/362,805, filed on Jul. 9, 2010, provisional application No. 61/315,500, filed on Mar. 19, 2010.

(30) Foreign Application Priority Data

Mar. 9, 2011 (KR) ........................ 10-2011-0021043

(51) Int. Cl.
*G06F 15/16* (2006.01)
*H04L 29/06* (2006.01)
*H04N 21/2343* (2011.01)
(Continued)

(52) U.S. Cl.
CPC ............ *H04L 65/602* (2013.01); *H04L 65/607* (2013.01); *H04N 21/2353* (2013.01); *H04N 21/2362* (2013.01); *H04N 21/23439* (2013.01); *H04N 21/2402* (2013.01); *H04N 21/6581* (2013.01); *H04N 21/812* (2013.01);
(Continued)

(58) Field of Classification Search
CPC ............................ H04L 29/0651; H04L 65/60
USPC ................. 709/217, 203, 228, 231, 232, 246; 725/20, 38, 54, 86
See application file for complete search history.

(56) References Cited

U.S. PATENT DOCUMENTS 5,612,742 A * 3/1997 Krause et al. ............ 375/240.25
5,784,528 A 7/1998 Yamane et al.

(Continued)

FOREIGN PATENT DOCUMENTS

CN 1290895 A 4/2001
CN 1459066 A 11/2003

(Continued)

OTHER PUBLICATIONS

International Search Report (PCT/ISA/210) issued on Nov. 3, 2011 in the International Patent Application No. PCT/KR2011/001898.

(Continued)

*Primary Examiner* — Michael Y Won
(74) *Attorney, Agent, or Firm* — Sughrue Mion, PLLC

(57) ABSTRACT

A streaming method and apparatus, in which information regarding a plurality of chapters of content is inserted into a media presentation description that includes information regarding a plurality of media data generated by encoding the content so as to have different qualities, and then, streaming is performed based on the information.

24 Claims, 33 Drawing Sheets

(51) Int. Cl.

| | |
|---|---|
| ***H04N 21/235*** | (2011.01) |
| ***H04N 21/2362*** | (2011.01) |
| ***H04N 21/24*** | (2011.01) |
| ***H04N 21/658*** | (2011.01) |
| ***H04N 21/81*** | (2011.01) |
| ***H04N 21/845*** | (2011.01) |

(52) U.S. Cl.
CPC ........ *H04N21/8456* (2013.01); *H04L 65/4084* (2013.01); *H04L 65/604* (2013.01); *H04L 65/80* (2013.01)

(56) References Cited

U.S. PATENT DOCUMENTS

| | | | | |
|---|---|---|---|---|
| 6,499,060 | B1 * | 12/2002 | Wang et al. | 709/231 |
| 6,536,043 | B1 * | 3/2003 | Guedalia | 725/90 |
| 6,851,091 | B1 | 2/2005 | Honda et al. | |
| 6,895,410 | B2 | 5/2005 | Ridge | |
| 6,996,618 | B2 * | 2/2006 | Apostolopoulos et al. | 709/227 |
| 7,043,560 | B2 * | 5/2006 | Coulombe et al. | 709/232 |
| 7,057,535 | B2 * | 6/2006 | Apostolopoulos et al. | 341/50 |
| 7,103,668 | B1 | 9/2006 | Corley et al. | |
| 7,277,958 | B2 * | 10/2007 | Chung et al. | 709/231 |
| 7,421,127 | B2 | 9/2008 | Bruls et al. | |
| 7,447,791 | B2 | 11/2008 | Leaning et al. | |
| 7,504,968 | B2 * | 3/2009 | Wee et al. | 341/50 |
| 8,059,711 | B2 * | 11/2011 | Ramaswamy et al. | 375/240.01 |
| 8,341,662 | B1 * | 12/2012 | Bassett et al. | 725/32 |
| 8,365,235 | B2 * | 1/2013 | Hunt et al. | 725/88 |
| 8,661,105 | B2 | 2/2014 | Tian et al. | |
| 8,838,680 | B1 * | 9/2014 | Jia | 709/203 |
| 2002/0053085 | A1 | 5/2002 | Toguri | |
| 2002/0161739 | A1 | 10/2002 | Oh | |
| 2003/0061369 | A1 | 3/2003 | Aksu et al. | |
| 2003/0072376 | A1 | 4/2003 | Krishnamachari et al. | |
| 2003/0177503 | A1 | 9/2003 | Sull et al. | |
| 2003/0189649 | A1 | 10/2003 | Kuno | |
| 2004/0064572 | A1 | 4/2004 | Yamaguchi et al. | |
| 2004/0064573 | A1 | 4/2004 | Leaning et al. | |
| 2004/0119814 | A1 | 6/2004 | Clisham et al. | |
| 2004/0220966 | A1 | 11/2004 | Ridge | |
| 2005/0018873 | A1 | 1/2005 | Rhoads | |
| 2005/0047345 | A1 | 3/2005 | Suh | |
| 2005/0071491 | A1 | 3/2005 | Seo | |
| 2005/0102371 | A1 * | 5/2005 | Aksu | 709/217 |
| 2005/0160177 | A1 | 7/2005 | Kim | |
| 2005/0183120 | A1 | 8/2005 | Jain et al. | |
| 2005/0193138 | A1 | 9/2005 | Kim | |
| 2005/0193425 | A1 | 9/2005 | Sull et al. | |
| 2005/0198282 | A1 | 9/2005 | Stahl et al. | |
| 2005/0210145 | A1 * | 9/2005 | Kim et al. | 709/231 |
| 2005/0262541 | A1 | 11/2005 | Oota | |
| 2006/0117360 | A1 * | 6/2006 | Cooper et al. | 725/100 |
| 2006/0120378 | A1 | 6/2006 | Usuki et al. | |
| 2006/0126713 | A1 | 6/2006 | Chou et al. | |
| 2007/0003251 | A1 | 1/2007 | Chung et al. | |
| 2007/0016657 | A1 | 1/2007 | Ito | |
| 2007/0025687 | A1 | 2/2007 | Kim | |
| 2007/0101164 | A1 | 5/2007 | Ando et al. | |
| 2007/0177854 | A1 | 8/2007 | Ando et al. | |
| 2008/0040498 | A1 | 2/2008 | Setlur et al. | |
| 2008/0046578 | A1 * | 2/2008 | van der Gaast | 709/229 |
| 2008/0162713 | A1 * | 7/2008 | Bowra et al. | 709/231 |
| 2008/0177865 | A1 | 7/2008 | Heo et al. | |
| 2008/0195743 | A1 | 8/2008 | Brueck et al. | |
| 2008/0301380 | A1 | 12/2008 | Itho | |
| 2009/0018681 | A1 | 1/2009 | Lee et al. | |
| 2009/0031007 | A1 | 1/2009 | Boic et al. | |
| 2009/0089535 | A1 | 4/2009 | Lohmar et al. | |
| 2009/0097819 | A1 | 4/2009 | Dui et al. | |
| 2009/0106288 | A1 | 4/2009 | Yang et al. | |
| 2009/0110060 | A1 | 4/2009 | Cortes et al. | |
| 2009/0141888 | A1 | 6/2009 | Kim et al. | |
| 2009/0161994 | A1 * | 6/2009 | Sauerwein et al. | 382/313 |
| 2009/0204487 | A1 | 8/2009 | Cansler et al. | |
| 2009/0258594 | A1 | 10/2009 | Martin-Cocher et al. | |
| 2009/0300145 | A1 | 12/2009 | Musayev et al. | |
| 2010/0046611 | A1 | 2/2010 | Toma et al. | |
| 2010/0054329 | A1 * | 3/2010 | Bronstein et al. | 375/240.03 |
| 2010/0138489 | A1 | 6/2010 | Corley et al. | |
| 2010/0235427 | A1 * | 9/2010 | Sotomaru et al. | 709/203 |
| 2010/0235528 | A1 * | 9/2010 | Bocharov et al. | 709/231 |
| 2013/0089142 | A1 * | 4/2013 | Begen et al. | 375/240.12 |
| 2013/0298170 | A1 * | 11/2013 | ElArabawy et al. | 725/62 |
| 2014/0053214 | A1 * | 2/2014 | Walker et al. | 725/62 |
| 2014/0143439 | A1 * | 5/2014 | Ramamurthy | 709/231 |
| 2014/0185670 | A1 * | 7/2014 | Wang | 375/240.12 |
| 2015/0256585 | A1 | 9/2015 | Brueck et al. | |

FOREIGN PATENT DOCUMENTS

| | | | |
|---|---|---|---|
| CN | 1481643 | A | 3/2004 |
| CN | 1559119 | A | 12/2004 |
| CN | 1568620 | A | 1/2005 |
| CN | 1575603 | A | 2/2005 |
| CN | 1592418 | A | 3/2005 |
| CN | 1698378 | A | 11/2005 |
| CN | 1764974 | A | 4/2006 |
| CN | 1784652 | A | 6/2006 |
| CN | 1787422 | A | 6/2006 |
| CN | 1902865 | A | 1/2007 |
| CN | 1985321 | A | 6/2007 |
| CN | 101014947 | A | 8/2007 |
| CN | 101018323 | A | 8/2007 |
| CN | 101247511 | A | 8/2008 |
| CN | 1 01 321 265 | A | 12/2008 |
| CN | 101365128 | A | 2/2009 |
| CN | 101371307 | A | 2/2009 |
| CN | 101459809 | A | 6/2009 |
| CN | 101518027 | A | 8/2009 |
| EP | 1 043 892 | A1 | 10/2000 |
| EP | 2117143 | A2 | 11/2009 |
| JP | 06-252876 | A | 9/1994 |
| JP | 200013761 | A | 1/2000 |
| JP | 2001-024994 | A | 1/2001 |
| JP | 2001-359081 | A | 12/2001 |
| JP | 2003-087737 | A | 3/2003 |
| JP | 2004-88766 | A | 3/2004 |
| JP | 2004-140584 | A | 5/2004 |
| JP | 2004-140654 | A | 5/2004 |
| JP | 2004-186890 | A | 7/2004 |
| JP | 2004-312304 | A | 11/2004 |
| JP | 2005-039667 | A | 2/2005 |
| JP | 2005-073138 | A | 3/2005 |
| JP | 2005-229153 | A | 8/2005 |
| JP | 2005-303927 | A | 10/2005 |
| JP | 2006-304232 | A | 11/2006 |
| JP | 2006-311328 | A | 11/2006 |
| JP | 2007-11584 | A | 1/2007 |
| JP | 2007-25959 | A | 2/2007 |
| JP | 2008-97381 | A | 4/2008 |
| JP | 2008-236667 | A | 10/2008 |
| JP | 2009-17345 | A | 1/2009 |
| JP | 2009-134700 | A | 6/2009 |
| JP | 2009-159625 | A | 7/2009 |
| KR | 100805308 | B1 | 2/2008 |
| KR | 1020080099629 | A | 11/2008 |
| KR | 1020090028017 | A | 3/2009 |
| KR | 1020090036765 | A | 4/2009 |
| KR | 10-2009-0063775 | A | 6/2009 |
| KR | 100920733 | B1 | 10/2009 |
| KR | 1020100007368 | A | 1/2010 |
| WO | 2006/105158 | A2 | 10/2006 |
| WO | 2008/062979 | A1 | 5/2008 |
| WO | 2008/130191 | A1 | 10/2008 |
| WO | 2009/119394 | A | 10/2009 |
| WO | 2009/158344 | A2 | 12/2009 |
| WO | 2005/043783 | A1 | 8/2014 |

OTHER PUBLICATIONS

Communication, dated Mar. 28, 2012, issued by the International Searching Authority in corresponding International Application No. PCT/KR2011/004064.

(56) References Cited

OTHER PUBLICATIONS

International Search Report, dated Jul. 8, 2011, issued by the International Patent Office in International Application No. PCT/KR2010/008016.
Written Opinion, dated Jul. 8, 2011, issued by the International Patent Office in counterpart International Application No. PCT/KR2010/008016.
International Search Report, dated Jul. 13, 2011, issued by the International Patent Office in counterpart International Application No. PCT/KR2010/008017.
Written Opinion, dated Jul. 13, 2011, issued by the International Patent Office in counterpart International Application No. PCT/KR2010/008017.
International Search Report, dated Jul. 15, 2011, issued by the International Patent Office in counterpart International Application No. PCT/KR2010/008068.
Written Opinion, dated Jul. 15, 2011, issued by the International Patent Office in counterpart International Application No. PCT/KR2010/008068.
International Search Report, dated Aug. 16, 2011, issued by the International Patent Office in counterpart International Application No. PCT/KR2010/008060.
Written Opinion, dated Aug. 16, 2011, issued by the International Patent Office in counterpart International Application No. PCT/KR2010/008060.
International Search Report, dated Jul. 25, 2011, issued by the International Patent Office in counterpart International Application No. PCT/KR2010/008015.
Written Opinion, dated Jul. 25, 2011, issued by the International Patent Office in counterpart International Application No. PCT/KR2010/008015.
International Search Report, dated Aug. 31, 2011, issued by the International Patent Office in counterpart International Application No. PCT/KR2010/008696.
Written Opinion, dated Aug. 31, 2011, issued by the International Patent Office in counterpart International Application No. PCT/KR2010/008696.
International Search Report, dated Nov. 25, 2011, issued by the International Patent Office in counterpart International Application No. PCT/KR2011/001268.
Written Opinion, dated Nov. 25, 2011, issued by the International Patent Office in counterpart International Application No. PCT/KR2011/001268.
Communication dated Aug. 27, 2014, issued by the State Intellectual Property Office of the People's Republic of China in counterpart Chinese Application No. 201080061494.4.
Communication dated Aug. 4, 2014, issued by the State Intellectual Property Office of the People's Republic of China in counterpart Chinese Application No. 201080061416.4.
Communication dated Aug. 5, 2014, issued by the Japanese Patent Office in counterpart Japanese Application No. 2012-538771.
Communication dated Aug. 20, 2014, issued by the State Intellectual Property Office of the People's Republic of China in counterpart Chinese Application No. 201080061434.2.
Communication dated Aug. 5, 2014, issued by the Japanese Patent Office in counterpart Japanese Application No. 2012-538768.
Communication dated Aug. 19, 2014, issued by the Japanese Patent Office in counterpart Japanese Application No. 2012-543023.
Communication dated Sep. 24, 2014, issued by the Japanese Patent Office in counterpart Japanese Application No. 2012-553824.
Communication dated Feb. 7, 2014 issued by the European Patent Office in counterpart European Application No. 10830205.0.
Pantos R., et al., "HTTP Live Streaming; draft-pantos-http-live-straming-0.2.txt", Oct. 5, 2009, 20 pgs. total, XP015064407.
Alex Zambelli, "IIS Smooth Streaming Technical Overview", Mar. 31, 2009, 17 pgs. total, XP055009366.
Jin Young Lee et al., "DASH Evaluation Experiment #1: Compositions of Media Presentation (CMP) Proposal Comparison", Oct. 15, 2010, 56 pgs. total, XP030046599.
Waqer Zia, "A few comments on LGE proposal about delivery of MPEG-2-TS", Oct. 15, 2010, 3 pgs. total, XP030047157.
Communication dated Feb. 12, 2014 issued by the European Patent Office in counterpart European Application No. 10830206.8.
Communication dated Feb. 12, 2014 issued by the European Patent Office in counterpart European Application No. 10830223.3.
Communication dated Feb. 25, 2014 issued by the European Patent Office in counterpart European Application No. 10830218.3.
Communication dated Mar. 4, 2014 issued by the European Patent Office in counterpart European Application No. 10830204.3.
Jaeyeon Song, et al., "Response to Call for Proposals for HTTP Streaming of MPEG Media standard", Jul. 30, 2010, 60 pgs. total, XP030046369.
Gerard Fernando, et al., "HTTP Streaming Solution-Response to Call for Proposal", Jul. 30, 2010, 32 pgs. total, XP030046346.
European Search Report dated Apr. 25, 2014 issued by the European Patent Office in counterpart European Application No. 10836186.6.
John A. Bocharov, "Smooth Streaming Technical Overview", CM-IPTV0560, Oct. 20, 2009, 18 pgs. total, XP017826991.
Communication dated Apr. 25, 2014 issued by the European Patent Office in counterpart European Application No. 11747701.8.
Communication dated Apr. 25, 2014 issued by the European Patent Office in counterpart European Application No. 11756585.3.
Communication dated Feb. 18, 2014 issued by the State Intellectual Property Office of P.R. China in counterpart Chinese Application No. 201080055449.8.
Communication dated Apr. 15, 2014 issued by the State Intellectual Property Office of P.R. China in counterpart Chinese Application No. 201080061413.0.
Communication dated May 22, 2014 issued by the European Patent Office in counterpart European Application No. 11790033.2.
Communication dated Jul. 2, 2014 issued by the State Intellectual Property Office of P.R. China in counterpart Chinese Application No. 201080061417.9.
Communication dated Jul. 3, 2014 issued by the State Intellectual Property Office of P.R. China in counterpart Chinese Application No. 201180010793.X.
Communication dated Jul. 1, 2014 issued by the Japanese Patent Office in counterpart Japanese Application No. 2012-538764.
Communication dated Jul. 15, 2014 issued by the Japanese Patent Office in counterpart Japanese Application No. 2012-538765.
"Transparent End-to-End Packet-Switched Streaming Service (PSS); Protocols and Codecs (Release 9)", 3GPP TS 26.234, Mar. 2012, 188 pages total.
"Release 2 Specification HTTP Adaptive Streaming", Open IPTV Forum, Sep. 2010, 25 pages total.
Communication dated Nov. 3, 2014, issued by the State Intellectual Property Office of the People's Republic of China in counterpart Chinese Application No. 201180014696.8.
Communication dated Dec. 19, 2014, issued by the Japanese Patent Office in counterpart Japanese Application No. 2012-543023.
Communication dated Mar. 24, 2015 issued by European Patent Office in counterpart European Application No. 11756585.3.
Communication from the Japanese Patent Office dated Mar. 23, 2015 in a counterpart Japanese application No. 2012-553824.
Communication from the State Intellectual Property Office of P.R. China dated Mar. 17, 2015 in a counterpart application No. 201080061417.9.
Communication from the Japanese Patent Office dated Apr. 13, 2015 in a counterpart Japanese application No. 2012-538771.
Communication from the Japanese Patent Office dated Feb. 2, 2015 in a counterpart Japanese application No. 2012-538765.
Communication from the Japanese Patent Office dated Apr. 6, 2015 in a counterpart Japanese application No. 2012-538764.
Communication dated Apr. 27, 2015 issued by the Japanese Patent Office in counterpart Japanese Patent Application No. 2012-538768.
Communication dated May 18, 2015, issued by the State Intellectual Property Office of the People's Republic of China in counterpart Chinese Application No. 201080061494.4.
Communication dated Jul. 9, 2015, issued by the State Intellectual Property Office of P.R. China in counterpart Chinese Application No. 201180014696.8.
Communication dated Aug. 13, 2015, issued by the State Intellectual Property Office of P.R. China in counterpart Chinese Application No. 201080061417.9.
Communication dated Aug. 5, 2015, issued by the State Intellectual Property Office of P.R. China in counterpart Chinese Application No. 201180027573.8.

* cited by examiner

FIG. 4A

```
<Tracks>
   <Track ID="1" Type="Packed" BitRate="200000">
   <Track ID="2" Type="Video" BitRate="400000">
</Tracks>
```

FIG. 4B

```
<RefData Type="HEAD-TS" ID="1">
        <URL>http://www.altova.com/movie1/head1.ref</URL>
</RefData>
<RefData Type="HEAD-TS" ID="2">
        <URL>http://www.altova.com/movie1/head2.ref</URL>
</RefData>
```

FIG. 4C

```
<Fragments NextFragmentsXMLURL="http://www.altova.com/movie1/NextMeta.xml">
        <Fragment StartTime="14:20:00.0Z" Duration="00:00:02.0z" ID="1"
BitRate="200000">
                <URL>http://www.altova.com/movie1/slice1-1.as</URL>
                <RefPointer>1</RefPointer>
        <Fragment StartTime="14:20:00.0Z" Duration="00:00:02.0z" ID="1"
BitRate="400000">
                <URL>http://www.altova.com/movie1/slice2-1.as</URL>
                <RefPointer>2</RefPointer>
</Fragments>
```

FIG. 7

```
<ContentItem>
  <Title xml:lang="en-us">Example</Title>
  <Synopsis xml:lang="en-us">String</Synopsis>
  <OriginSite>http://asexample.com</OriginSite>
  <OriginStateName>Example</OriginSiteName>
  <ContentID>18888</ContentID>
  <ContentURL VideoCoding="AVC" Duration="14:20:00.00" Size="0" MediaFormat="MP4" DRMSystemID="12" MD5Hash=
     "String" MIMIType="video/MP4"TransferType="AS-CoD" AudioCoding="AAC'>http://asexample.com/vod/movies/18888/
     Meta/MainMeta.xml</ContentURL>
</ContestItem>
</Contents>
```

FIG. 9A

```xml
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <RefDataURL>http://asexample.com/vod/movies/18888/References/header2.ref</RefDataURL>
    <Track ID="1" Type="Video" Bitrate="500000" StartTime='00:00:00" SegmentDuration="00:00:10' SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Audio" Bitrate="64000" StartTime="00:00:00" SegmentDuration="00:00:30" SegmentStartID="1000" SegmentCount="120"/>
    <Track ID="5" Type="I-Frame" Bitrate="500000' StartTime='00:00:00" SegmentDuration="00:00:10" SegmentStartID="1000" SegmentCount="360"/>
</AdaptiveControl>
```

FIG. 9B

```xml
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime='10:00:00" SegmentDuration="00:00:06' SegmentStartID="1000" SegmentCount="10"/>
    <Track ID="2" Type="Video" Bitrate="1000000" StartTime="10:00:00" SegmentDuration="00:00:06" SegmentStartID="1000" SegmentCount="10"/>
    <Track ID="3" Type="Video" Bitrate="2000000" StartTime="10:00:00" SegmentDuration="00:00:06" SegmentStartID="1000" SegmentCount="10"/>
    <Track ID="4" Type="Audio" Bitrate="64000" StartTime="10:00:00" SegmentDuration="00:00:30" SegmentStartID="1000" SegmentCount="2"/>
</AdaptiveControl>
```

FIG. 9C

```xml
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:01:00" SegmentDuration="00:00:06" SegmentStartID="1010" SegmentCount="10"/>
    <Track ID="2" Type="Video" Bitrate="1000000" StartTime="10:01:00" SegmentDuration="00:00:06" SegmentStartID="1010" SegmentCount="10"/>
    <Track ID="3" Type="Video" Bitrate="2000000" StartTime="10:01:00" SegmentDuration="00:00:06" SegmentStartID="1010" SegmentCount="10"/>
    <Track ID="4" Type="Audio" Bitrate="64000" StartTime="10:01:00" SegmentDuration="00:00:30" SegmentStartID="1010" SegmentCount="2"/>
</AdaptiveControl>
```

FIG. 9D

```xml
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Video" Bitrate="3000000" StartTime="00:00:00" SegmentDuration="00:00:10" SegmentStartID="1000" SegmentCount="360"/>
    <Track ID="5" Type="Video" Bitrate="4000000" StartTime="00:00:00" SegmentDuration="00:00:10" SegmentStartID="1000" SegmentCount="360"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9E

```
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Video" Bitrate="3000000" StartTime="00:00:00" SegmentDuration="00:00:10" SegmentStartID="1000" SegmentCount="360"/>
    <Track ID="5" Type="Video" Bitrate="4000000" StartTime="00:00:00" SegmentDuration="00:00:10" SegmentStartID="1000" SegmentCount="60"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9F

```
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:02:00" SegmentDuration="00:00:10" SegmentStartID="1000" SegmentCount="348"/>
    <Track ID="3" Type="Video" Bitrate="2000000" StartTime="00:02:00" SegmentDuration="00:00:10" SegmentStartID="1000" SegmentCount="348"/>
    <Track ID="4" Type="Video" Bitrate="3000000" StartTime="00:02:00" SegmentDuration="00:00:10" SegmentStartID="1000" SegmentCount="348"/>
    <Track ID="5" Type="Video" Bitrate="4000000" StartTime="00:02:00" SegmentDuration="00:00:10" SegmentStartID="1000" SegmentCount="348"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9G

```
<AdaptiveControl xsi:noNamespaceSchemaLocation="samsung_as.xsd" xmlns:xsi="http://www.w3.org/2001/XMLSchema-instance">
    <NextAdaptiveControlURL>http://asexample.com/live/movies/18888/Meta/NextMeta.xml</NextAdaptiveControlURL>
    <Track ID="1" Type="Packed" BitRate="500000">
        <Segment StartTime="00:00:00.00" Duration="00:02:00.00" ID="1000">
            <URL>http://ad_server.com/ad_for_adaptive/ad1.ts</URL>
        </Segment>
    </Track>
</AdaptiveControl>
```

FIG. 9H

```
<AdaptiveControl xsi:noNamespaceSchemaLocation="samsung_as.xsd" xmlns:xsi="http://www.w3.org/2001/XMLSchema-instance">
    <URL Template>http://asexample.com/vod/movies/18888/Tracks/Seg{TrackID}-{SegmentID}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:00:00" SegmentDuration="00:00:06" SegmentStartID="1000" SegmentCount="10"/>
    <Track ID="2" Type="Video" Bitrate="1000000" StartTime="10:00:00" SegmentDuration="00:00:06" SegmentStartID="1000" SegmentCount="10"/>
    <Track ID="3" Type="Video" Bitrate="2000000" StartTime="10:00:00" SegmentDuration="00:00:06" SegmentStartID="1000" SegmentCount="10"/>
    <Track ID="4" Type="Audio" language="EN" Bitrate="64000" StartTime="10:00:00" SegmentDuration="00:00:30" SegmentStartID="1000" SegmentCount="2"/>
    <Track ID="5" Type="Audio" language="KR" Bitrate="64000" StartTime="10:00:00" SegmentDuration="00:00:30" SegmentStartID="1000" SegmentCount="2"/>
    <Track ID="6" Type="Subtitle" language="EN" Bitrate="0" StartTime="10:00:00" SegmentDuration="00:00:30" SegmentStartID="1000" SegmentCount="2"/>
    <Track ID="7" Type="Subtitle" language="KR" Bitrate="0" StartTime="10:00:00" SegmentDuration="00:00:30" SegmentStartID="1000" SegmentCount="2"/>
</AdaptiveControl>
```

FIG. 14A

```
<MPD>
  <Chaptering mimeType="jpeg/mp4" URL="chaptering.jpg" ImageInterval="1sec" height="128" width="256" compressionType="ZIP"/ >
  <Period>
    <Representation /> <- for video
    ...
  </Period>
    ....
  <Period>
    <Representation /> <- for video
      ...
  </Period>
   ...
<MPD>
```

FIG. 14B

```
<MPD>
  <Period>
    <Representation /> <- for video
    //for chaptering data
    <Representation mimeType="jpeg/mp4" width="270" height="180"  ImageInterval="10 sec">
        <SegmentInfo duration="PT10M"(for segment duration)  >
          ...
          <Url sourceURL="seg-1.3gp"/>
          <Url sourceURL="seg-2.3gp"/>
          <Url sourceURL="seg-3.3gp"/>
        </SegmentInfo>
    </Representation>
  </Period>
   ....
  <Period>
    <Representation /> <- for video
    <Representation /> <- for chaptering data
  </Period>
   ....
<MPD>
```

FIG. 14C

```
<MPD>
  <Period>
    <Representation /> <- for video
    //for chaptering data
    <Representation mimeType="jpeg/mp4" width="270" height="180"  >
        <SegmentInfo duration="PT10M"(for segment duration)  >
          ...
          <Url sourceURL="seg-1.3gp"  ImagePresentationTime="00:00:00"/>
         <Url sourceURL="seg-2.3gp"  ImagePresentationTime="00:00:10"/>
          <Url sourceURL="seg-3.3gp"  ImagePresentationTime="00:00:25"/>
...
        </SegmentInfo>
     </Representation>
   </Period>
    ....
  <Period>
    <Representation /> <- for video
    <Representation /> <- for chaptering data
   </Period>
   ....
<MPD>
```

FIG. 14D

```
<MPD>
  <Chaptering mimeType="jpeg/mp4" URL="~~/chaptering.mp4"
   lang="Eng" contentviewpoint="navigation" ImageInterval="10sec"
   height="128" width="256" compressionType="ZIP"/ >
  <Period>
    <Representation> <- for video
      <SegmentInfo />
   ...
  </Period>
   ....
  <Period>
    <Representation /> <- for video
     ...
  </Period>
  ...
<MPD>
```

FIG. 14E

```
<MPD>
  <Period>
    <Representation /> <- for video
    //for chaptering data
    <Representation mimeType="jpeg/mp4" contentviewpoint="navigation" width="270" height="180"
      ImageInterval="10 sec">
        <SegmentInfo duration="PT10M"(for segment duration)  >
          ...
          <Url sourceURL="seg-1.mp4"/>
          <Url sourceURL="seg-2.mp4"/>
          <Url sourceURL="seg-3.mp4"/>
        </SegmentInfo>
    </Representation>
  </Period>
   ....
  <Period>
    <Representation /> <- for video
    <Representation /> <- for chaptering data
  </Period>
  ....
<MPD>
```

FIG. 14F

```
<MPD>
  <Period>
    <Representation /> <– for video
    //for chaptering data
    <Representation mimeType="jpeg/mp4" contentviewpoint="navigation" width="270" height="180"
      ImageInterval="10 sec">
        <SegmentInfo duration="PT10M"(for segment duration)  >
          ...
          <Url sourceURL="seg–1.mp4"  ImagePresentationTime="00:00:00"/>
         <Url sourceURL="seg–2.mp4"  ImagePresentationTime="00:20:00"/>
          <Url sourceURL="seg–3.mp4"  ImagePresentationTime="00:40:00"/>
...
        </SegmentInfo>
     </Representation>
   </Period>
    ....
  <Period>
    <Representation /> <– for video
    <Representation /> <– for chaptering data
   </Period>
   ....
<MPD>
```

FIG. 14G

```
<MPD>
  <Period>
    <Representation /> <- for video
    //for chaptering data
    <Representation mimeType="jpeg/mp4" chapterurl="~~/chapter_data.mp4" contentviewpoint="navigation"
      width="270" height="180" ImageInterval="10 sec"/>
  </Period>
   ....
  <Period>
    <Representation /> <- for video
    <Representation /> <- for chaptering data
   </Period>
   ....
<MPD>
```

FIG. 14H

```
<MPD>

  <Period>
    <Representation ··· /> <- for video

     <Representation mimeType="jpeg/mp4" contentviewpoint='chapter" width="270" height="180">
      //for chaptering
      <SegmentInfo >
          ...
      <Url sourceURL="seg-1.jpg"  time="00:00:00" >
             <lang="Eng"  title="chapter 1" description="Description of chapter 1 in English"/>
             <lang="Kor"  title="chapter 1" description="Description of chapter 1 in Korean"/>
             <lang="Jpn"   title="chapter 1" description="Description of chapter 1in
Japanese"/>
       </Url>

       <Url sourceURL="seg-2.jpg"  time="00:00:00" >
             <lang="Eng"  title="chapter 2" description="Description of chapter 2 in English"/>
             <lang="Kor"  title="chapter 2" description="Description of chapter 2 in Korean"/>
             <lang="Jpn"   title="chapter 2" description="Description of chapter 2 in
Japanese"/>
       </Url>
       <Url sourceURL="seg-3.jpg"  time="00:00:00" >
             <lang="Eng"  title="chapter 3" description="Description of chapter 3 in English"/>
             <lang="Kor"  title="chapter 3" description="Description of chapter 3 in Korean"/>
             <lang="Jpn"   title="chapter 3" description="Description of chapter 3 in
Japanese"/>
       </Url>
             ...
      </SegmentInfo>
     </Representation>

</MPD>
```

FIG. 15B

```
<?xml version="1.0" encoding="UTF-8"?>
<xs:schema xmlns:xs="http://www.w3.org/2001/XMLSchema">
  <xs:element name="ChapterInfo">
    <xs:complexType>
        <xs:sequence>
          <xs:element name="ChapterItems" type="ChapterItemsType"/>
        </xs:sequence>
    </xs:complexType>
  </xs:element>
  <xs:complexType name="ChapterItemsType">
    <xs:sequence>
        <xs:element name="ChapterItem" type="ChapterItemType" maxOccurs="unbounded"/>
    </xs:sequence>
    <xs:attribute name="ThubnailImgUrlTemplate" type="xs:anyURI" use="required"/>
    <xs:attribute name="imgWidth" type="xs:integer" use="required"/>
    <xs:attribute name="imgHeight" type="xs:integer" use="required"/>
  </xs:complexType>
  <xs:complexType name="ChapterItemType">
    <xs:sequence>
        <xs:element name="Title" minOccurs="0" maxOccurs="unbounded">
          <xs:complexType>
                <xs:attribute name="lang" type="xs:string"/>
          </xs:complexType>
        </xs:element>
        <xs:element name="Tag" minOccurs="0" maxOccurs="unbounded">
          <xs:complexType>
                <xs:attribute name="lang" type="xs:string"/>
          </xs:complexType>
        </xs:element>
    </xs:sequence>
    <xs:attribute name="id" type="xs:string" use="required"/>
    <xs:attribute name="time" type="xs:duration" use="required"/>
  </xs:complexType>
</xs:schema>
```

FIG. 16

```
<?xml version="1.0" encoding="UTF-8"?>
<ChapterInfo xmlns:xsi='http://www.w3.org/2001/XMLSchema-instance">
  <ChapterItems ThumbnailImagUrlTemplate="http://www.movie.com/avatar/chapt$ID$.jpg" imgWidth="120" imgHeight="100">
    <ChapterItem id="1" time="00:10:00">
        <Title lang="eng">leave the home</Title>
        <Description lang="eng">bbbb...</Description>
    </ChapterItem>
    <ChapterItem id="2" time="00:30:00">
        <Title lang="eng">meet friends</Title>
        <Tag lang="eng">restaurant</Tag>
        <Description lang="eng">cccc...</Description>
    </ChapterItem>
</ChapterInfo>
```

METHOD AND APPARATUS FOR ADAPTIVELY STREAMING CONTENT INCLUDING PLURALITY OF CHAPTERS

CROSS-REFERENCE TO RELATED PATENT APPLICATION

This application claims the benefit of U.S. Provisional Patent Application No. 61/315,500, filed on Mar. 19, 2010, U.S. Provisional Patent Application No. 61/362,805, filed on Jul. 9, 2010, and U.S. Provisional Patent Application No. 61/439,985, filed on Feb. 7, 2011, in the U.S. Patent and Trademark Office, and Korean Patent Application No. 10-2011-0021043, filed on Mar. 9, 2011 in the Korean Intellectual Property Office, the disclosures of which are incorporated herein in their entireties by reference.

BACKGROUND

1. Field

Exemplary embodiments relate to a streaming method and apparatus, and more particularly, to a method and apparatus for adaptively streaming media data according to fluctuations in a streaming environment.

2. Description of the Related Art

Examples of a method of transmitting media data through a network include a downloading method and a streaming method. In the streaming method, a server transmits media data in real time, and a client reproduces the received media data in real time.

Unlike the downloading method that starts to reproduce media data after transmitting and receiving the media data, since the streaming method transmits and receives the media data through a logical channel set between the server and the client, and reproduces the media data in real time, a method and apparatus for maintaining quality of service (QoS) in reproducing the media data by reflecting fluctuations in a streaming environment are required.

SUMMARY

Methods and apparatuses consistent with exemplary embodiments generally relate to adaptively adjusting and performing streaming, i.e., adaptively transmitting and receiving media data according to a streaming environment.

An exemplary embodiment also provides a non-transitory computer readable recording medium having recorded thereon a program which when executed by a computer performs the methods described herein.

According to an exemplary embodiment, there is provided a method of receiving media data, the method including receiving a file including information regarding a plurality of media data generated by encoding content so as to have different qualities, from a server; and receiving at least one media data from among the plurality of media data, based on the received file, wherein the file comprises information regarding a plurality of still images corresponding to a plurality of chapters of the content.

The receiving of the at least one media data may include receiving the plurality of still images, based on the received file; and receiving the at least one media data, starting from a chapter selected based on the plurality of still images.

The file may include a first tag including at least one from among location information, resolution information, and compression type information regarding the plurality of still images.

The first tag may have a same level as a second tag that identifies a reproduction period of the content.

The first tag may have a same level as a third tag that is subject to a second tag, which identifies a reproduction period of the content, and that defines a plurality of media data to be reproduced in a predetermined reproduction period.

The first tag may further include information regarding intervals between the plurality of still images.

According to another exemplary embodiment, there is provided a method of transmitting media data, the method including transmitting a file including information regarding a plurality of media data generated by encoding content so as to have different qualities, to a client; and transmitting at least one media data from among the plurality of media data to the client, in response to a request based on the transmitted file, received from the client, wherein the file comprises information regarding a plurality of still images corresponding to a plurality of chapters of the content.

The transmitting of the at least one media data to the client may include transmitting the plurality of still images to the client, in response to the request based on the received file, received from the client; and transmitting the at least one media data, starting from a chapter selected by the client based on the plurality of still images.

According to another embodiment, there is provided an apparatus which receives media data, the apparatus including an information receiving unit which receives a file including information regarding a plurality of media data generated by encoding content so as to have different qualities, from a server; and a media data receiving unit which receives at least one media data from among the plurality of media data, based on the received file, wherein the file comprises information regarding a plurality of still images corresponding to a plurality of chapters of the content.

According to another embodiment, there is provided an apparatus which transmits media data, the apparatus including an information transmitting unit which transmits a file including information regarding a plurality of media data generated by encoding content so as to have different qualities, to a client; and a media data transmitting unit which transmits at least one media data from among the plurality of media data to the client, in response to a request based on the transmitted file, received from the client, wherein the file comprises information regarding a plurality of still images corresponding to a plurality of chapters of the content.

According to another embodiment, there is provided a non-transitory computer readable recording medium having stored thereon a computer readable program which when executed by a computer performs the method of receiving media data and/or the method of transmitting media data.

BRIEF DESCRIPTION OF THE DRAWINGS

The above and/or other features and advantages of the inventive concept will become more apparent by describing in detail exemplary embodiments thereof with reference to the attached drawings in which:

FIG. 4A illustrates information for defining a plurality of media data, according to an exemplary embodiment;

FIG. 4B illustrates information about a header of media data, according to an exemplary embodiment;

FIG. 4C illustrates information about at least one segment included in each one of a plurality of media data, according to an exemplary embodiment;

FIG. 7 illustrates information about content according to an exemplary embodiment;

FIGS. 9A, 9B, 9C, 9D, 9E, 9F, 9G and 9H illustrate media presentation descriptions according to exemplary embodiments;

FIGS. 14A through 14H illustrate media presentation descriptions according to other embodiments;

FIGS. 15A and 15B illustrate schemas of a chapter according to other embodiments;

FIG. 16 illustrates information regarding a chapter, according to an embodiment;

DETAILED DESCRIPTION

Hereinafter, exemplary embodiments will be described more fully with reference to the accompanying drawings, in which exemplary embodiments are shown. Expressions such as "at least one of," when preceding a list of elements, modify the entire list of elements and do not modify the individual elements of the list.

Figure 1:
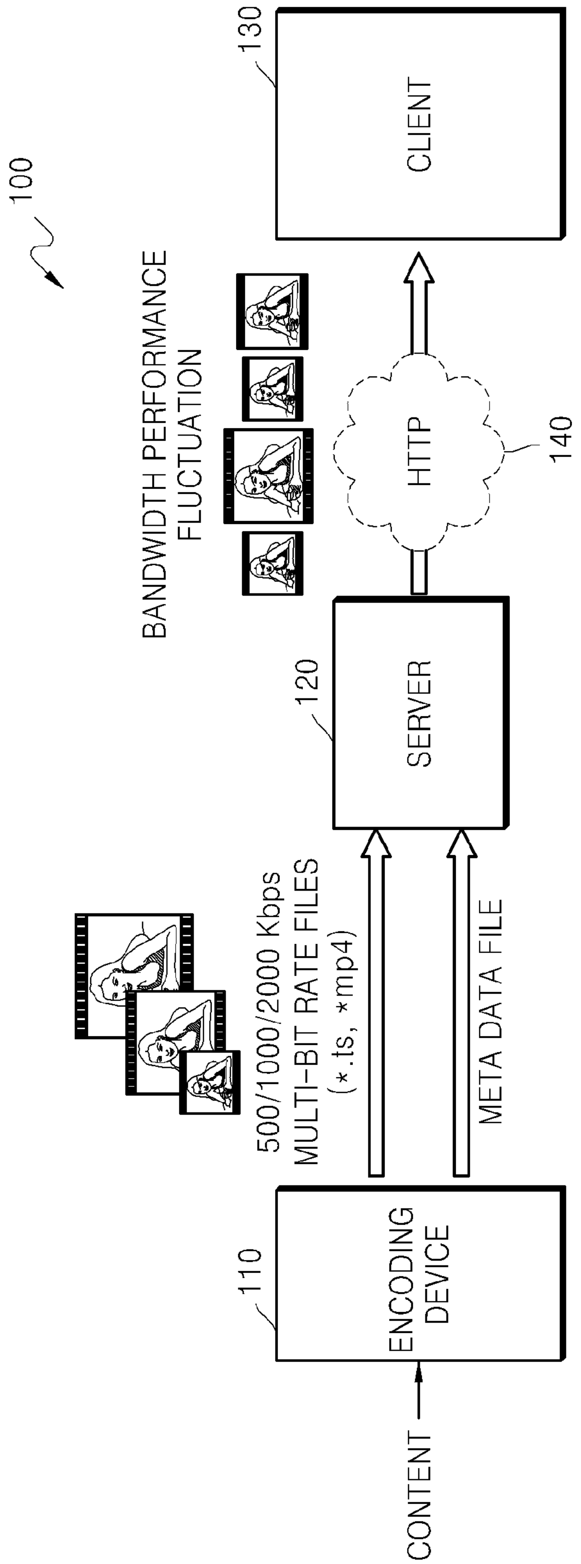
FIG. 1 is a diagram of a streaming system according to an exemplary embodiment.

FIG. 1 is a diagram of a streaming system 100 according to an exemplary embodiment.

Referring to FIG. 1, the streaming system 100 according to an exemplary embodiment includes an encoding device 110, a server 120, and a client 130.

The encoding device 110 generates a plurality of media data about one input content by encoding the input content to have a plurality of different qualities. A streaming environment may change when the server 120 streams media data to the client 130. For example, a bandwidth of a network 140 for streaming may be changed, or a hardware source that may be used by the server 120 to transmit media data or by the client 130 to receive media data may be changed.

Accordingly, the encoding device 110 encodes one content to have different qualities for adaptive streaming according to a fluidic streaming environment. One content may be encoded to have different qualities by adjusting a factor, such as a bit rate, a sampling frequency, resolution, or a frame rate. For example, a plurality of media data in 500 Kbps, 1000 Kbps, and 2000 Kbps may be generated by encoding one image content in different resolutions.

The plurality of media data in different qualities are transmitted to the server 120, and at this time, information about the content and information about each media data may also be transmitted to the server 120. The information about the content may include, but is not limited to, information about a title, a synopsis, a content identifier (ID), and a content uniform resource locator (URL) of the content as metadata of the content. The information about each media data may include a quality, a type, an ID, or the like of each media data, and will be described in detail with reference to FIGS. 4A, 4B and 4C.

The client 130 receives at least one of the information about content and information about each media data, and requests the server 120 for at least one of the plurality of media data, based on the received at least one of the information about content and information about each media data. The client 130 estimates a streaming environment, and selects at least one of the plurality of media data based on the estimated streaming environment. The at least one media data that may maintain a suitable quality of service (QoS) in the estimated streaming environment may be selected. Then, the client 130 may transmit a hypertext transfer protocol (HTTP) request requesting the server 120 to transmit the selected at least one media data.

When a streaming environment is deteriorated and high quality media data is received but continuous reproduction of media data is not possible, low quality media data may be requested from among a plurality of media data. When a streaming environment is improved and high quality media data is received and continuous reproduction of media data is possible, the high quality media data may continue to be requested from among a plurality of media data.

The client 130 may request the server 120 to transmit another media data while receiving a predetermined media data. For example, the client 130, which requested and was receiving first media data that is of low quality in a deteriorated streaming environment, may request the server 120 to transmit second media data that is of a higher quality than the first media data as the streaming environment improves. According to a conventional streaming method, when the server 120 and the client 130 sets a quality while initially setting a streaming channel, media data is continuously transmitted and received having the same quality. However, according to an exemplary embodiment, streaming that is adaptive to the streaming environment is possible since the client 130 is able to request the second media data again even while receiving the first media data about the same content.

The client 130 may estimate a streaming environment by using any method of estimating a streaming environment based on the bandwidth of the network 140 or the hardware resource that may be used by the server 120 or the client 130. For example, the client 130 may estimate the streaming environment based on a time stamp and a bit error rate (BER) of received media data. The streaming environment may be determined to be deteriorated when media data is received slower than a reproduction speed by checking time stamps of the received media data. Alternatively, the streaming environment may be determined to be deteriorated when BERs of the received media data are increased.

When the client 130 requests the server 120 to transmit at least one of the media data according to the streaming environment, the server 120 transmits requested media data to the client 130. The server 120 may transmit the requested media data to the client 130 as an HTTP response to the HTTP request.

Each media data may include at least one of a plurality of segments generated by encoding content in different qualities and dividing the encoded content. In other words, each media data generated by encoding the content by the encoding device 110 may include at least one segment divided based on time. The server 120 transmits the content by dividing the content into the plurality of segments and respectively transmitting the plurality of segments, instead of encoding the content in one stream and continuously transmitting the content. The plurality of segments may be generated by dividing the content into predetermined time units, such as units of 10 or 20 seconds. The time that is the basis for dividing the content may be set based on a group of pictures (GOP). Media data corresponding to pictures of one or more GOPs may be set as one segment.

For example, when content is streamed having two qualities, the first media data may include at least one segment generated by encoding the content to have a first quality and dividing the encoded content based on time, and the second media data may include at least one segment generated by encoding the content to have a second quality and dividing the encoded content based on time.

The adaptive streaming is possible by dividing each media data based on time. For example, when streaming starts, the server 120 transmits a segment corresponding to 0 to 20 seconds of the first media data that is of low quality. Then, when it is determined that the streaming environment is improved after 20 seconds and the client 130 requests media data that is of higher quality, the server 120 may transmit a segment corresponding to 20 to 40 seconds of the second media data that is of the higher quality. Since media data is divided into a plurality of segments based on time, segments of different media data may be transmitted according to a streaming environment, even during streaming.

Figure 2A:
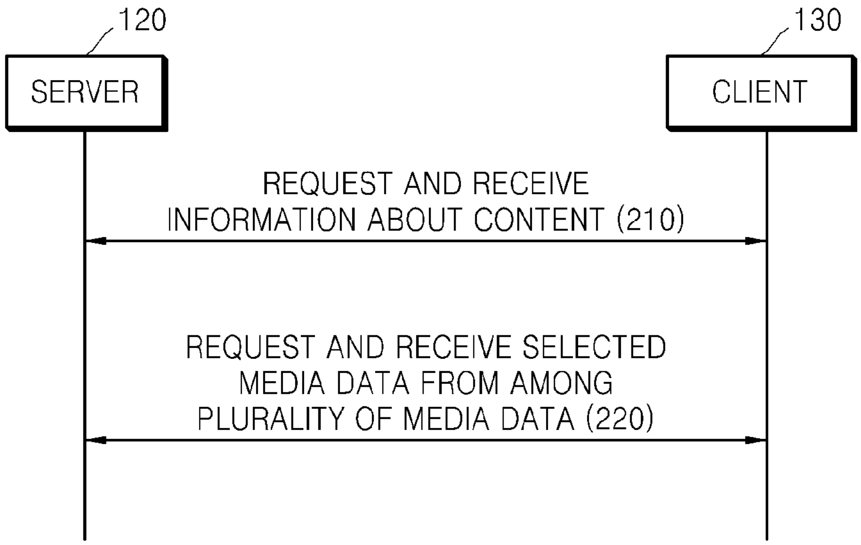
FIGS. 2A and 2B are flowcharts for describing streaming methods according to exemplary embodiments.

FIG. 2A is a flowchart for describing a streaming method according to an exemplary embodiment.

Referring to FIG. 2A, the client 130 transmits a request to the server 120 to transmit information about predetermined content, in operation 210. When a user of the client 130 selects the predetermined content from a user interface displayed on a screen of the client 130, the client 130 requests the server 120 to transmit information about the selected content. The client 130 may transmit an HTTP request requesting the server 120 to transmit information about predetermined content.

Upon receiving the request from the client 130, the server 120 transmits the information about the predetermined content to the client 130. The server 120 may transmit the information about the predetermined content as an HTTP response to the HTTP request to the client 130. The information about the predetermined content may be a content access descriptor (CAD) according to an open IPTV forum (OIPF) standard. The information about the predetermined content will now be described in detail with reference to FIG. 3.

Figure 3:
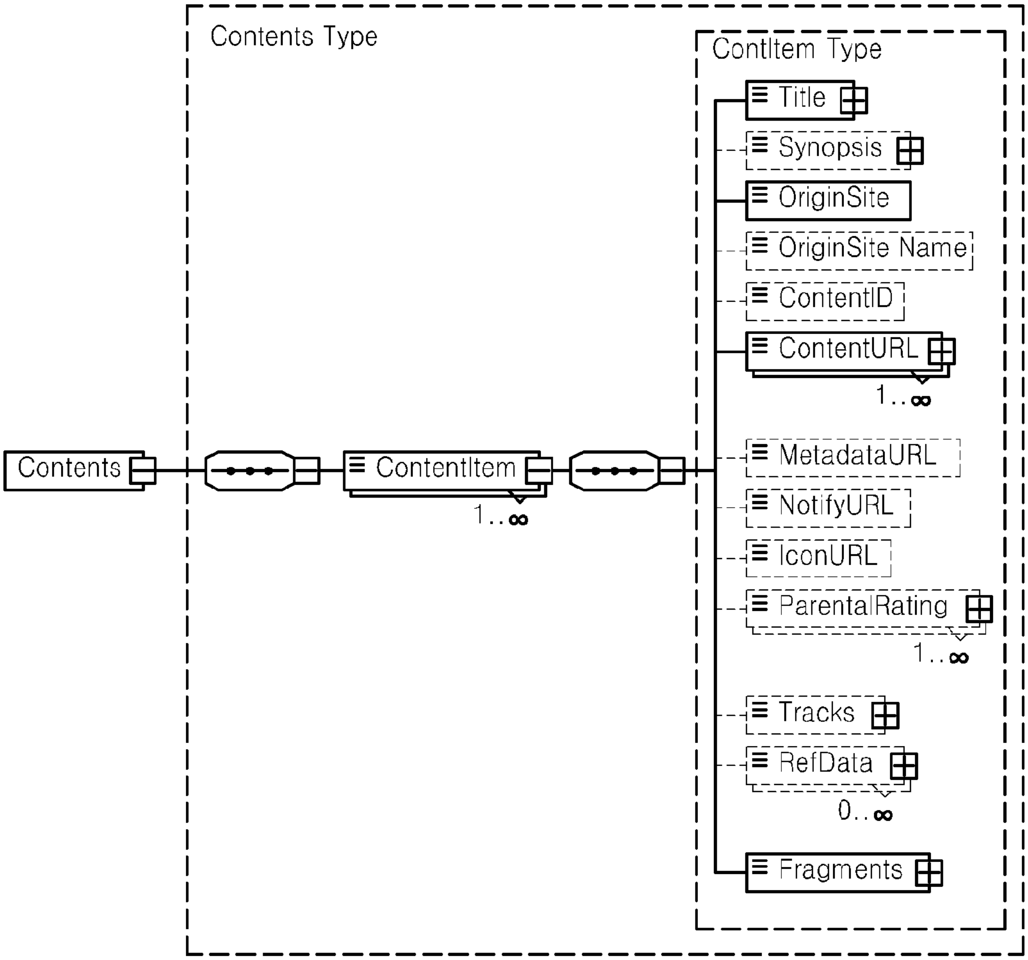
FIG. 3 is a schema of a file including information about content, according to an exemplary embodiment.

FIG. 3 is a schema of a file including information about content, according to an exemplary embodiment. The file may be a CAD, and may be an eXtensible Markup Language (XML) file. A tag and an attribute are separately described, but it is understood that according to an exemplary embodiment an item defined by a tag can be defined by an attribute or an item defined by an attribute can be defined by a tag.

Referring to FIG. 3, the information about content may include "Title", "Synopsis", "OriginSite", and "ContentURL" tags.

Since conventional streaming of media data generates one media data by encoding one content to have a predetermined quality, conventional information (specifically, CAD according to OIPF) about content does not include information about a plurality of media data generated by encoding the content to have different qualities.

However, the information about content, according to the present exemplary embodiment, includes information about a plurality of media data generated by encoding one content to have different qualities, and corresponds to "Tracks", "RefData", and "Fragments" tags in FIG. 3.

FIG. 4A illustrates information for defining a plurality of media data, according to an exemplary embodiment.

Referring to FIG. 4A, a "Tracks" tag is information for classifying a plurality of media data generated by encoding content to have different qualities. The "Tracks" tag includes an "ID" attribute, a "Type" attribute, and a "BitRate" attribute assigned to each media data.

The "ID" attribute defines identifiers sequentially given to the plurality of media data, and the "Type" attribute defines whether media data corresponds to audio data, video data, video/audio data, or subtitle data. When the "Type" attribute is "Packed", the media data is video/audio data, and when the "Type" attribute is "Video", the media data is video data. The "BitRate" attribute defines a bit rate used to encode the media data.

FIG. 4B illustrates information about a header of media data, according to an exemplary embodiment.

Referring to FIG. 4B, a "RefData" tag includes a "Type" attribute and an "ID" attribute. The "Type" attribute defines a media format of a header. For example, when the "Type" attribute is "HEAD-TS", the header is a header of a transport stream format. The "ID" attribute defines a media data of a header. When the "ID" attribute is "1", the header is a header of media data having a media data ID of "1". Also, the "RefData" tag includes information pointing to a header, and an "URL" tag defines a location of a header, i.e., a URL of a header.

The "RefData" tag is a selective element. The "RefData" tag is included in information about content only when a header is separated from media data and exists as a separate file, and may not be included in the information about content when the header is combined with the media data.

FIG. 4C illustrates information about at least one segment included in each of a plurality of media data, according to an exemplary embodiment.

Referring to FIG. 4C, a "Fragment" tag, which is a sub tag of a "Fragments" tag, includes the information about at least one segment included in each of the plurality of media data.

The "Fragments" tag includes a "NextFragmentsXMLURL" attribute. When following content is continuously streamed after streaming of one content is completed like in the case of live streaming, the following content may be seamlessly streamed only when the client 130 is aware of information about the following content. Accordingly, the "Fragments" tag defines the information about the following content as the "NextFragmentsXMLURL" attribute. URLs of the plurality of media data with respect to the following content may be defined as the "NextFragmentsXMLURL" attribute.

The "Fragment" tag includes information about at least one segment of current content. Referring to FIG. 4C, URL information of "slice1-1.as" constituting a first segment generated by encoding content in a first quality as first media data is defined by a "URL" tag, and an ID of a corresponding header is defined by a "RefPointer" tag. Also, a starting time of the first segment is defined by a "StartTime" attribute, and a duration time of each segment is defined by a "Duration" attribute. A quality of the first media data is defined by a "BitRate" attribute.

In FIG. 4C, the "Fragments" tag shows each media data including only one segment. However, as described above with reference to FIG. 1, it is understood that according to an exemplary embodiment, when each media data is divided into a plurality of segments, one "Fragments" tag may include information about at least two segments.

Referring back to FIG. 2A, the client 130 requests the server 120 to transmit at least one of the plurality of media data, in operation 220. The plurality of media data are generated by encoding one content to have different qualities. The client 130 selects at least one media data encoded to have a quality suitable for a streaming environment from among the plurality of media data, and requests the server 120 for the selected at least one media data. The client 130 may transmit an HTTP request to the server 120 based on information about the plurality of media data, which is included in the information about the content.

As described with reference to FIG. 4C, the information about the content may include a "Fragments" tag. Accordingly, the client 130 requests the server 120 to transmit selected media data based on URL information included in the "Fragments" tag.

The server 120 transmits the media data according to the request of the client 130. The server 120 may transmit at least one segment of the requested media data to the client 130. The server 120 may transmit media data requested as an HTTP response with respect to an HTTP request to the client 130.

Figure 2B:
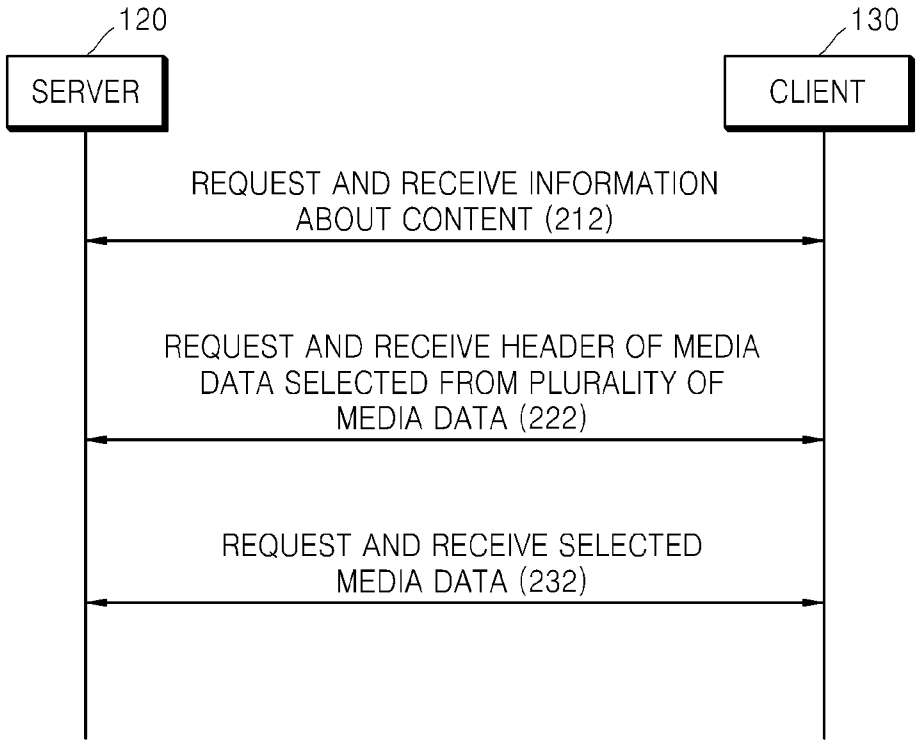

FIG. 2B is a flowchart for describing a streaming method according to another exemplary embodiment. FIG. 2B illustrates the streaming method when a header exists as a separate file from media data.

Referring to FIG. 2B, the client 130 requests the server 120 to transmit information about predetermined content, in operation 212, and the server 120 transmits the information about content. Operation 212 corresponds to operation 210 of FIG. 2A. The information about content including the "RefData" tag described above with reference to FIG. 4B is received.

In operation 222, the client 130 requests a header of selected media data from among a plurality of media data, based on the information about content received in operation 212. At least one media data suitable for a streaming environment is selected from among the plurality of media data based on the information about content received in operation 212, and a header of the selected at least one media data is requested. The header of the selected at least one media data is requested by referring to the "RefData" tag included in the information about content received in operation 212.

The server 120 transmits the requested header to the client 130. A header file may be transmitted to the client 130, and may be an XML file.

In operation 232, the client 130 requests the server 120 to transmit selected media data based on the information about content received in operation 212 and the header received in operation 222. The client 130 requests the server 120 to transmit at least one segment generated by dividing media data based on time, and the server 120 transmits the requested at least one segment to the client 130.

Figure 5A:
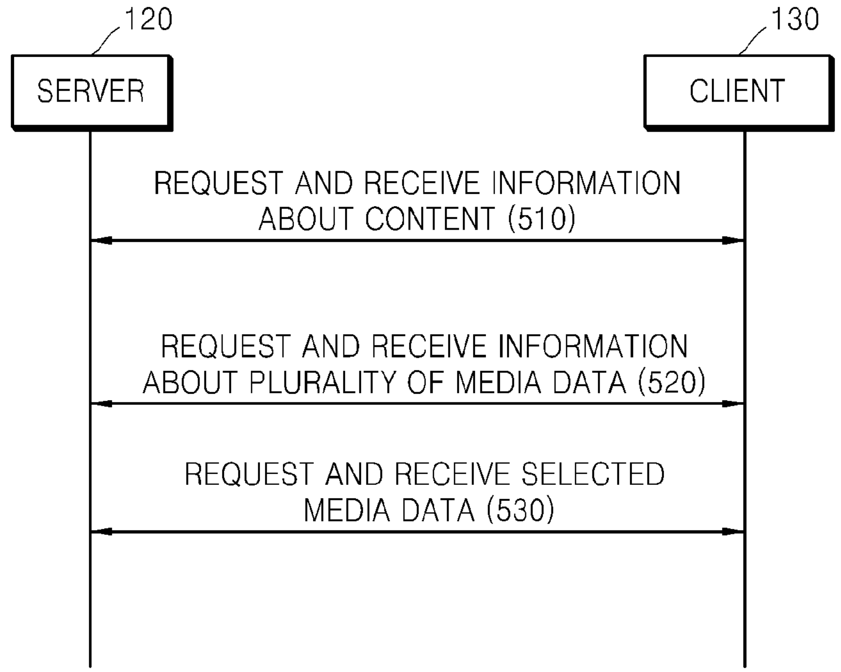
FIGS. 5A and 5B are flowcharts for describing streaming methods according to other exemplary embodiments.

FIG. 5A is a flowchart for describing a streaming method according to another exemplary embodiment.

Referring to FIG. 5A, the client 130 requests the server 120 to transmit information about predetermined content, in operation 510, and the server 120 transmits the information about content. The client 130 transmits an HTTP request for requesting the server 120 to transmit the information about content, and receives the information about content as an HTTP response to the HTTP request. The information about content may be an XML file. The information about content received by the client 130 in operation 510 is different from the information about content received by client 130 in operation 210 of FIG. 2, and the difference will now be described with reference to FIGS. 6 and 7.

Figure 6:
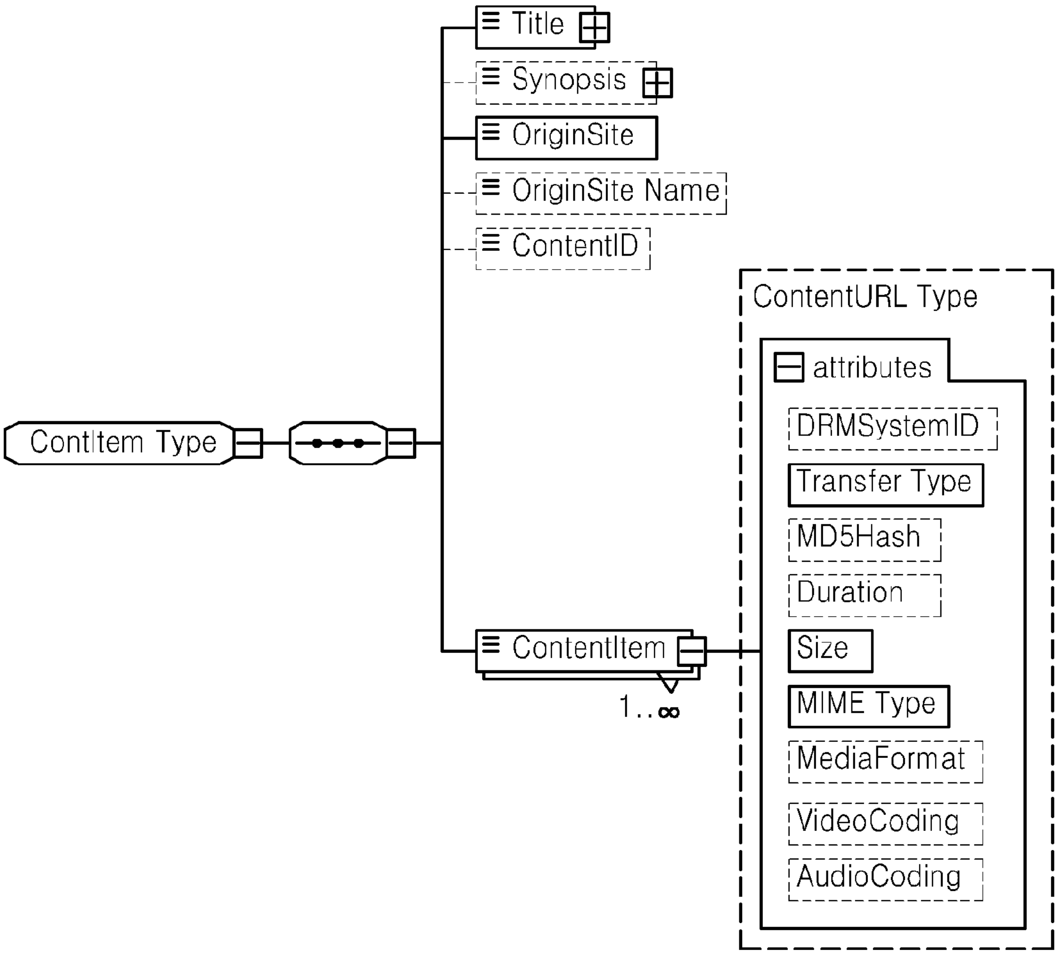
FIG. 6 is a schema of a file including information about content, according to another exemplary embodiment.

FIG. 6 is a schema of a file including information about content, according to another exemplary embodiment.

Referring to FIG. 6, the information about content according to the present exemplary embodiment may include "Title", "Synopsis", "OriginSite", and "ContentURL" tags like FIG. 3.

However, in FIG. 3, the information about content includes the information about the plurality of media data by including the "Tracks", "RefData", and "Fragments" tags, whereas in FIG. 6, instead of including the information about the plurality of media data, the information about content only defines a URL of a file (hereinafter, referred to as a "media presentation description") including the information about the plurality of media data. The "ContentURL" tag may define the URL of the media presentation description.

Compatibility with various media data formats may be maintained while performing streaming that is adaptive to a streaming environment by inserting the URL of the media presentation description into the information about content as shown in FIG. 6, without largely changing conventional schema of the file containing the information about content.

As shown in FIG. 6, the information about content may only include information related to the streaming method, and not include the information about the plurality of media data. In other words, the "ContentURL" tag may include a "MediaFormat" attribute defining a format of media data used during streaming, and a "MIMEType" attribute defining a type of media data.

Specifically, the "ContentURL" tag may include a "TransferType" attribute defining a service to which streaming of content is related. The "TransferType" attribute may define whether the streaming of content is related to a Content on Delivery (CoD) service, a live service, an adaptive streaming live service, or an adaptive streaming CoD service.

FIG. 7 illustrates information about content according to an exemplary embodiment. FIG. 7 may be a CAD according to the OIPF standard.

Referring to FIG. 7, the information about content generated according to the schema of FIG. 6 may define a URL of a media presentation description in a "ContentURL" tag. http://asexample.com/vod/movies/18888/Meta/MainMeta.xml is the URL of the media presentation description. Also, as described with reference to FIG. 6, the "MediaFormat" attribute, the "MIMEType" attribute, and the "TransferType" attribute may be defined in the "ContentURL" tag.

Referring back to FIG. 5A, in operation 520, the client 130 requests the server 120 for the information about the plurality of media data, based on the information about content received in operation 510. The client 130 may request a media presentation description to the server 120 through an HTTP request, and may receive the media presentation description as an HTTP response.

The information about content received by the client 130 from the server 120 in operation 510 may include the URL of the media presentation description as described with reference to FIGS. 6 and 7, and thus the client 130 requests and receives the media presentation description from the server 120 by referring to the "ContentURL" tag of the information about content. The media presentation description will now be described in detail with reference to FIGS. 8A and 8B, and FIGS. 9A, 9B, 9C, 9D, 9E, 9F, 9G and 9H.

Figure 8A:
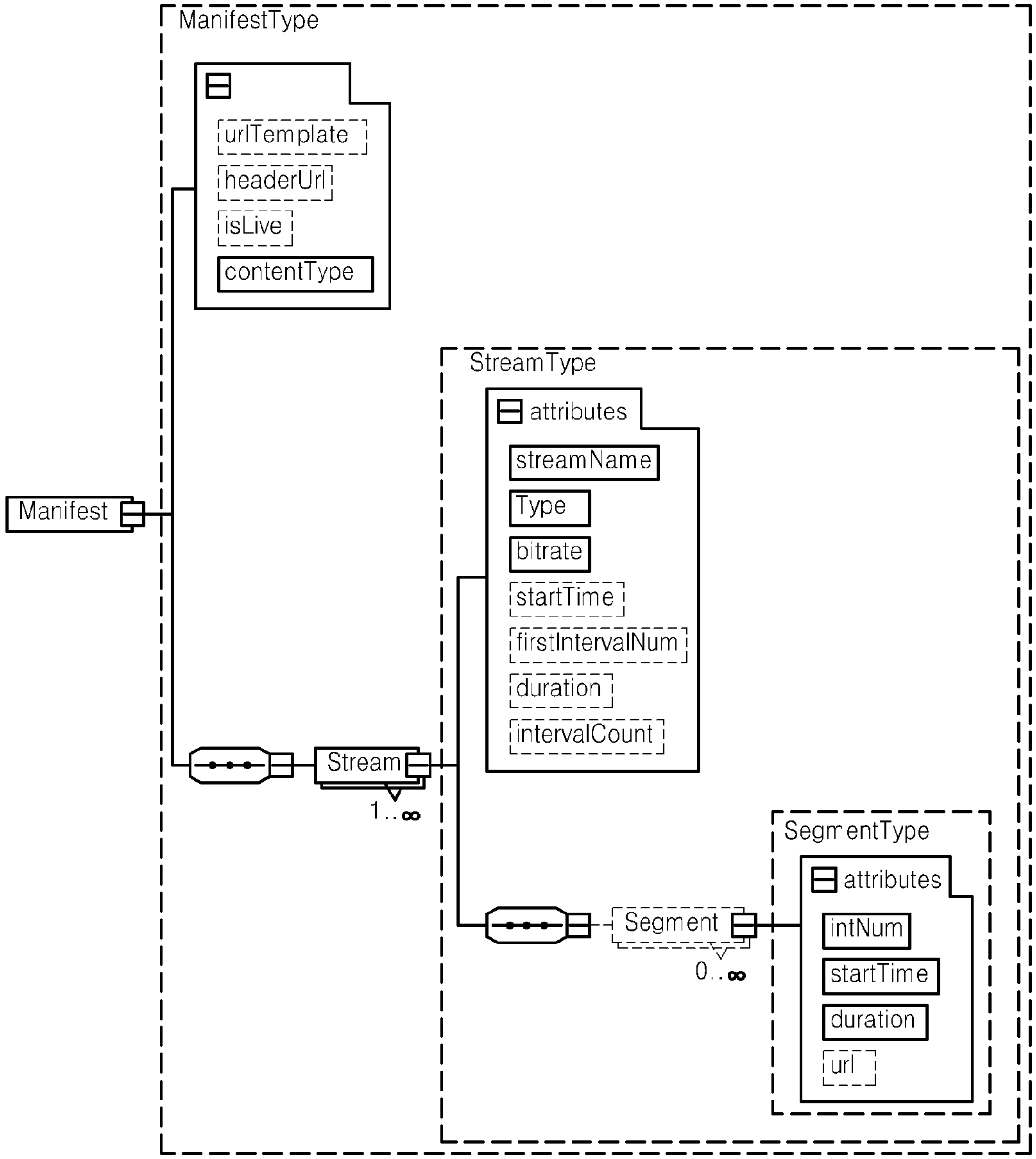
FIGS. 8A and 8B are schemas of a media presentation description according to exemplary embodiments.
Figure 8B:
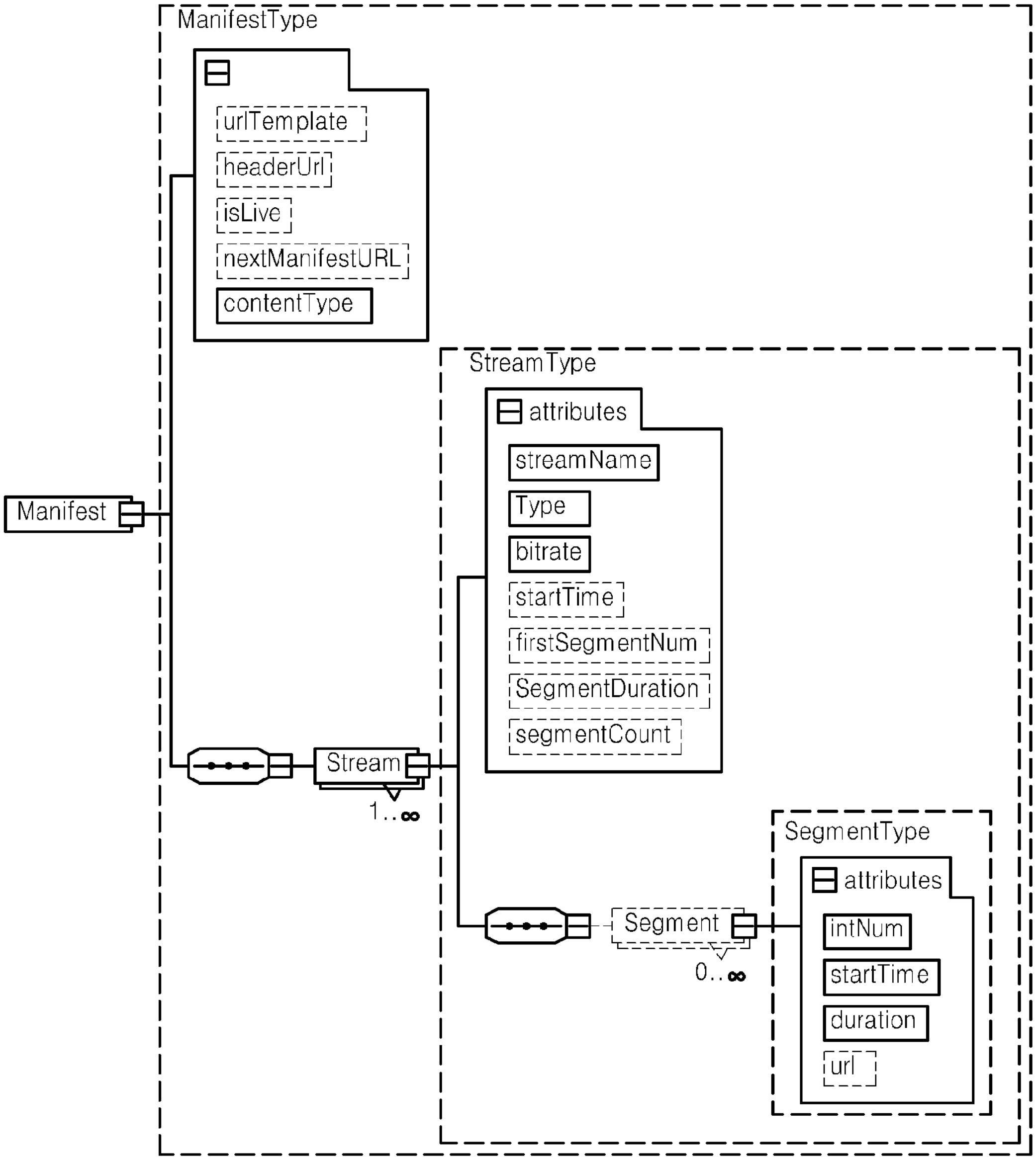

FIGS. 8A and 8B are schemas of a media presentation description according to exemplary embodiments. The media presentation description may comply with the OIPF standard.

Referring to FIG. 8A, the media presentation description according to the present exemplary embodiment includes a template tag about URLs of a plurality of media data, a tag for defining a location of a header, a tag for defining to which service the streaming is related to, a tag for defining a container format of media data, and a tag for defining the plurality of media data.

An "urlTemplate" tag defines a common portion of the URLs of the plurality of media data. For example, if "http://example.com/vod/movie/18888/Track/{TrackID}/Segments/{SegmentID}" is a URL template, a URL of media data may be defined by respectively substituting an ID of each media data and an ID of at least one segment included in each media data for "TrackID" and "SegmentID".

A "headerUrl" tag corresponds to the "RefData" tag described with reference to FIG. 4B. In other words, the "headerUrl" tag defines URLs of headers of the plurality of media data.

An "is Live" tag defines a service related to streaming. For example, when the "is Live" tag is defined as "Live", the streaming is related to a live service, and when the "is Live" tag is defined as "CoD", the streaming is related to a CoD service.

A "contentType" tag defines a container format of media data used during streaming. The "contentType" tag may indicate whether the container format is an MP4 format or an MPEG2-TS format. The container format is an MP4 format or an MPEG2-TS format herein, However, though it is understood that according to an exemplary embodiment the container format is not limited thereto, and any container format for transmitting media data may be used. For example, the "contentType" tag may define that the container format complies with an MPEG Media Transport (MMT) standard.

A "Stream" tag is generated for each media data and defines each media data. In order to define each media data generated by encoding one content to have different qualities, the "Stream" tag includes a "streamName" attribute, a "type" attribute, a "bitrate" attribute, a "startTime" attribute, a "firstIntervalNum" attribute, a "duration" attribute, and an "intervalCount" attribute.

The "streamName" attribute defines a name of media data, and may be an ID of media data. The "type" attribute defines a type of media data, wherein it is defined whether the media data is audio data, video data, or audio/video data. When media data only includes data about an I-frame for a trick play, such information may be defined in the "type" attribute.

The "bitrate" attribute defines a bit rate of media data, the "startTime" attribute defines a time stamp for specifying a starting time of media data, and the "firstIntervalNum" attribute defines a number of a segment that initially starts.

The "duration" attribute defines a duration time of a segment included in media data, and the "intervalCount" attribute defines a total number of at least one segment included in media data.

The "Segment" tag is a sub tag of the "Stream" tag, and as described above, when media data includes at least one segment generated by encoding content in a predetermined quality and dividing the encoded content based on time, each of the at least one segment is defined.

The "IntNum" attribute defines a number of a segment, and the "StartTime" tag defines a starting time of a corresponding segment. The "Duration" tag defines a duration time of a corresponding segment, and the "url" defines a URL of a corresponding segment.

The "Segment" tag is a selective tag, and may not be included in the media presentation description if the information about at least one segment included in the media data can be inferred from other attributes of the "Stream" tag. In other words, when content of the "Segment" tag can be inferred from the "startTime", "firstIntervalNum", "duration", and "intervalCount" attributes defined in the "Stream" tag, the "Segment" tag may not be included in the media presentation description. Also, a "url" attribute of the "Segment" tag may not be required if a predetermined template is defined in the "urlTemplate", and the URLs of segments are inferred by substituting each ID of the plurality of media data and an ID of at least one segment included in each media data with the defined predetermined template.

However, on the other hand, attributes of the "Segment" tag are separately defined for each segment, if the attributes of the "Segment" tag cannot be inferred from other attributes of the "Stream" tag. The attributes of the "Segment" tag may not be inferred if duration times of segments are different. When duration times are different, the duration times of segments included in media data cannot be inferred from the attributes of the "Stream" tag, and thus the duration times of the segments may be each set by using a "duration" attribute of the "Segment" tag. When the duration times of the segments are different, starting times of continuous segments are also different. For example, when a duration time of a first segment of first media data is different from a duration time of a second segment of the first media data, a starting time of the second segment and a starting time of a third segment cannot be inferred from the "Stream" tag. Accordingly, a starting time of each segment may be defined by a "startTime" attribute.

The duration times and/or starting times may be defined by using a sub tag of the "Segment" tag, instead of using the "duration" attribute and the "startTime" attribute of the "Segment" tag. For example, a "Url" tag constituting a sub tag of the "Segment" tag may be set, and a duration time may be defined as an attribute of the "Url" tag, such as "<Url=www.example.com/~/segment.ts,duration=10/>".

According to another exemplary embodiment, duration time may be defined based on a difference between duration times of continuous segments. An upper tag may define a default duration time, and the "Url" tag constituting the sub tag may define only a difference between the default duration time and an actual duration time for each segment. As described above, the "Url" tag constituting the sub tag of the "Segment" tag may be defined as "<Url=www.example.com/~/segment.ts,duration=difference/>". "Difference" denotes a difference between the default duration time and the actual duration time.

When a default duration time of a corresponding segment is defined to be 10 minutes by using the "Stream" tag or the "Segment" tag, and the "Url" tag constituting the sub tag is defined to be "<Url=www.example.com/~/segment.ts,duration=2/>", a duration time of the corresponding segment may be defined to be 10+2=12 minutes.

Referring to FIG. 8B, the media presentation description according to another exemplary embodiment may further include a "nextManifestURL" tag. As described above, when following content is continuously streamed after streaming of one content is completed, such as in the case of live streaming or advertisement insertion, the client 130 requires to preknow information about the following content so as to stream the following content seamlessly. Accordingly, a URL of a media presentation description of the following content to be streamed after current content may be defined by the "nextManifestURL" tag.

FIGS. 9A, 9B, 9C, 9D, 9E, 9F, 9G and 9H illustrate media presentation descriptions according to exemplary embodiments.

Referring to FIG. 9A, the media presentation description according to an exemplary embodiment includes a “URLTemplate” tag, a “RefDataURL” tag, and a plurality of tags respectively defining a plurality of media data.

The “URLTemplate” tag and the “RefDataURL” tag of FIG. 9A respectively correspond to the “urlTemplate” tag and the “RefDataURL” tag of FIGS. 8A and 8B.

An “ID” attribute, a “Type” attribute, a “BitRate” attribute, a “StartTime” attribute, a “SegmentDuration” attribute, a “SegmentStartID” attribute, and a “SegmentCount” attribute of FIG. 9A respectively correspond to the “streamName” attribute, the “type” attribute, the “bitrate” attribute, the “startTime” attribute, the “duration” attribute of the “Stream” tag, the “firstIntervalNum” attribute of the “Stream” tag, and the “intervalCount” attribute of FIGS. 8A and 8B.

The media presentation description of FIG. 9A includes information about three video data generated by encoding content to have different qualities, information about one audio data, and information about media data generated by encoding only I-frames for a trick play.

Referring to FIG. 9B, the media presentation description according to an exemplary embodiment further includes a “NextAdaptiveControlURL” tag. The “NextAdaptiveControlURL” tag corresponds to the “nextManifestURL” tag of FIG. 8B. Accordingly, a URL of a media presentation description of following content to be reproduced after current content may be defined by the “NextAdaptiveControlURL” tag.

FIG. 9C shows a media presentation description of the following content, when the URL of the media presentation description of the following content to be reproduced after the current content is defined by the “NextAdaptiveControlURL” tag of FIG. 9B. Comparing the media presentation descriptions of FIGS. 9B and 9C, a “StartTime” attribute is different from the media presentation description of the current content of FIG. 9B, since the media presentation description of FIG. 9C is for the following content.

FIGS. 9D and 9E illustrate media presentation descriptions for selectively controlling high quality video reproduction that a user want to perform. FIG. 9D illustrates the media presentation description when a plurality of media data are generated by encoding one content to have 5 different qualities. Here, the media presentation descriptions of FIGS. 9D and 9E are different in a tag including information about video encoded to have high quality, i.e., a “StartTime” attribute and a “SegmentCount” attribute of media data having an “ID” attribute of “5”.

The server 120 selectively transmits the media presentation description of FIG. 9D or the media presentation description of FIG. 9E according to a user rating of the client 130. When the user rating of the client 130 is high (for example, when the client 130 is a paid user), the media presentation description of FIG. 9D is transmitted so that high quality video is freely reproduced, and when the user rating of the client 130 is low (for example, when the client 130 is a free user), the media presentation description of FIG. 9E is transmitted so that segments defined by the “SegmentCount” attribute are reproduced from a time defined by the “StartTime” attribute in high quality video.

FIG. 9F illustrates a media presentation description when an advertisement is inserted into content. Referring to FIG. 9F, the media presentation description may include information about advertisement content and main content, which have different “StartTime” attributes. The media presentation description may include information about advertisement content, which is reproduced from “00:00:00” to “00:02:00” at a bit rate of “500000”, and information about main content, which is reproduced from “00:02:00” at bit rates of “1000000”, “2000000”, “3000000”, or “4000000”. The media presentation description of FIG. 9F may be transmitted from the server 120 to the client 130 if the server 120 provides the advertisement content to the client 130 by encoding the advertisement content to have one bit rate, and provides the main content, which has a different “StartTime” attribute from the advertisement content, to the client 130 by encoding the main content in four different bit rates.

FIG. 9G illustrates a media presentation description including information about advertisement content, according to an exemplary embodiment. A server for providing main content and a server for providing advertisement content may be different. In other words, when the client 130 receives the main content from the server 120 of FIG. 5A and receives the advertisement content from a server other than the server 120, the media presentation description of FIG. 9G may include a URL of the advertisement content. As shown in FIG. 9G, the media presentation description may include the URL of the advertisement content that is encoded to have one quality.

FIG. 9H illustrates a media presentation description including language and subtitle information, according to an exemplary embodiment. Referring to FIG. 9H, audio data may include information about multiple languages. The media presentation description may include information about audio data of multiple languages, wherein an “ID” attribute is “4” or “5”, or information about subtitles of multiple languages, wherein the “ID” attribute is “6” or “7”.

Since not only the audio data, but also the subtitle may be divided into a plurality of segments according to time, the audio data and the subtitle may be changed to audio data and a subtitle of another language during streaming.

Referring back to FIG. 5A, the client 130 requests the server 120 to transmit at least one of the plurality of media data, in operation 530. The client 130 selects at least one media data that is encoded to have a quality suitable for the streaming environment by referring to the information about the plurality of media data, and requests the server 120 for the selected at least one media data. The client 130 may transmit an HTTP request for requesting the server 120 to transmit a predetermined media data. The server 120 transmits the media data according to the request of the client 130. Alternatively, the server may transmit at least one segment generated by encoding content to have a predetermined quality and dividing the encoded content based on time, to the client 130. The server 120 may transmit the requested media data to the client 130 as an HTTP response to the HTTP request.

Figure 5B:
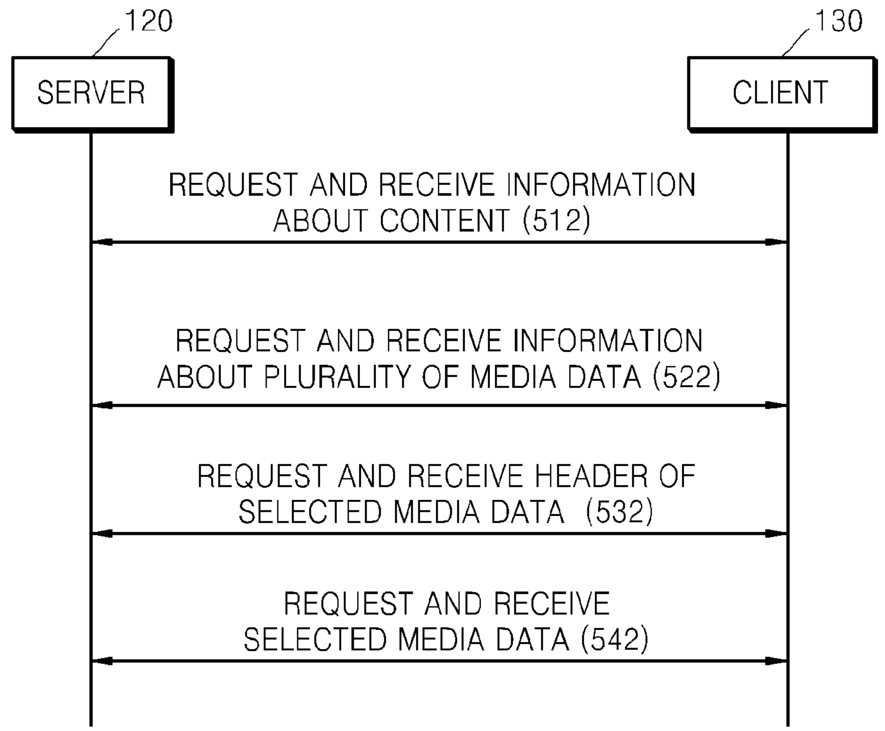

FIG. 5B is a flowchart for describing a streaming method according to another exemplary embodiment.

Referring to FIG. 5B, the client 130 requests the server 120 to transmit information about predetermined content, in operation 512, and receives the information about predetermined content from the server 120. The client 130 may transmit an HTTP request for requesting the server 120 to transmit the information about predetermined content, and receive the information about predetermined content as an HTTP response to the HTTP request. The information about predetermined content may be included in an XML file.

In operation 522, the client 130 requests the server 120 to transmit information about a plurality of media data based on the information about predetermined content received in operation 512. The client 130 may request the server 120 for a media presentation description through the HTTP request, and receive the media presentation description as the HTTP response.

In operation 532, the client 130 requests a header of media data selected based on the information about a plurality of media data received in operation 522. At least one media data that is suitable to a streaming environment is selected from among the plurality of media data based on the information about the plurality of media data received in operation 522, and a header of the selected at least one media data is requested. The header of the selected at least one media data is requested by referring to the information about the plurality of media data received in operation 522. The server 120 transmits a file of the header of the selected at least one media data to the client 130 in response to the request of the client 130.

In operation 542, the client 130 requests the server 120 to transmit selected media data based on the information about the plurality of media data received in operation 522, and the header received in operation 532. The client 130 requests the server 120 to transmit at least one segment generated by encoding content to have a predetermined quality and dividing the encoded content based on time, and the server 120 transmits the requested at least one segment to the client 130.

Figure 10A:
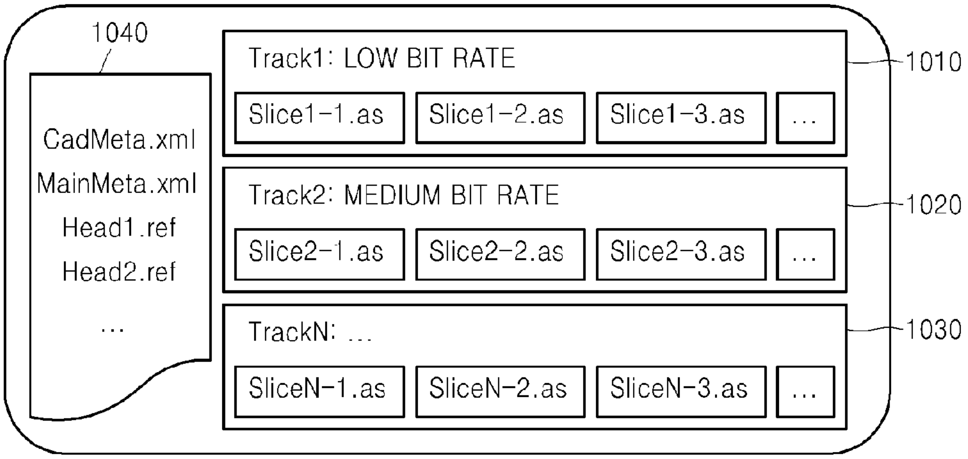
FIGS. 10A, 10B and 10C each illustrate a plurality of media data according to exemplary embodiments.
Figure 10B:
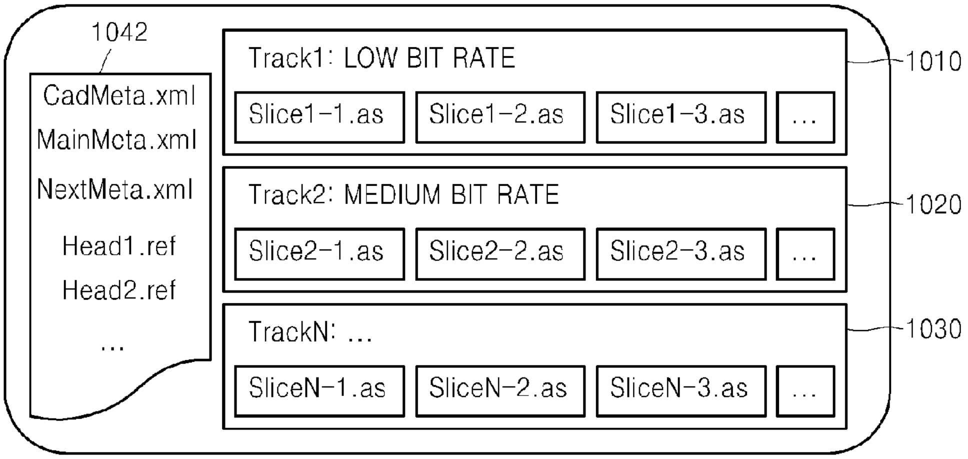
Figure 10C:
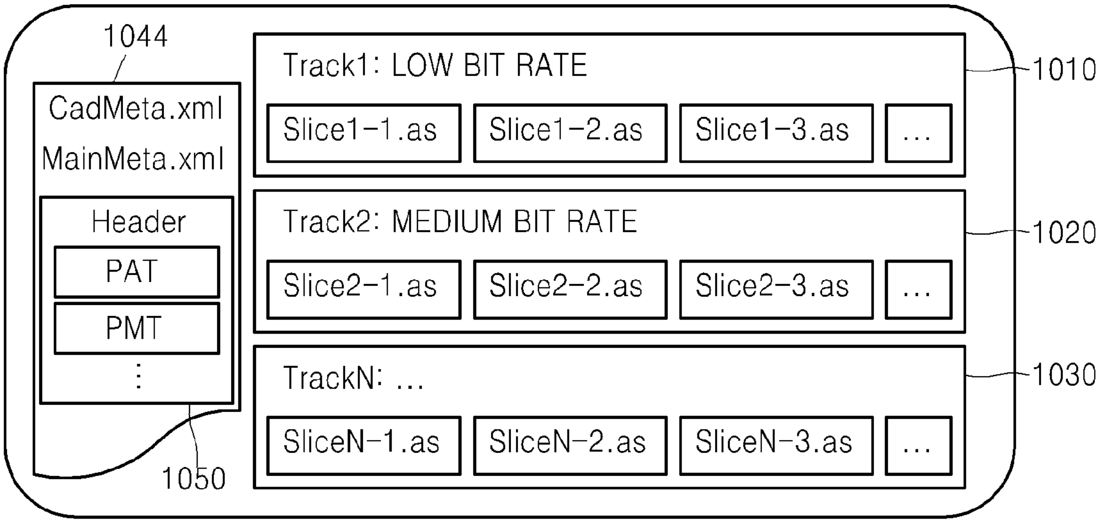

FIGS. 10A, 10B and 10C each illustrate a plurality of media data according to exemplary embodiments. FIGS. 10A, 10B and 10C each illustrate the plurality of media data included in the server 120 to perform the streaming methods according to FIGS. 5A and 5B.

Referring to FIG. 10A, the server 120 may include a plurality of media data 1010 through 1030 generated by encoding one content to have a plurality of different qualities, for streaming that is adaptive to a streaming environment. "Track1" through "TrackN" denote the plurality of media data 1010 through 1030. Also, each of the plurality of media data 1010 through 1030 may include at least one segment generated by dividing each of the plurality of media data 1010 through 1030 based on time. "Slice1-1.as", "Slice1-2.as", "Slice1-3.as", "Slice2-1.as", "Slice2-2.as", "Slice2-3.as", "SliceN-1.as", "SliceN-2.as", and "SliceN-3.as" denote at least one segment.

The server 120 may include information 1040 required for the client 130 to access the plurality of media data 1010 through 1030. The server 120 may include a "CadMeta.xml" file as information about content, a "MainMeta.xml" file as information about the plurality of media data 1010 through 1030, and a "Head1.ref" file, a "Head2.ref" file, etc. as header files of the plurality of media data 1010 through 1030. Here, the "Head1.ref" file may be a header file of the "Track1", and the "Head2.ref" file may be a header file of the "Track2".

The "CadMeta.xml" file may be a CAD file according to the OIPF standard, and the "MainMeta.xml" file may be the media presentation description described above. Also, the "Head1.ref" and "Head2.ref" files are selective elements, and may not exist when headers are included in the plurality of media data 1010 through 1030.

Referring to FIG. 10B, information 1042 required for the client 130 to access the plurality of media data 1010 through 1030 may further include a "NextMeta.xml" file. As described above, the "NextMeta.xml" file may be a media presentation description of a following content to be reproduced after current content. As described above, the media presentation description of the current content, i.e., the "MainMeta.xml" file, includes the URL of the media presentation description of the following content, and thus the client 130 may access the "NextMeta.xml" file based on the "MainMeta.xml" file.

Referring to FIG. 10C, header files of the plurality of media data 1010 through 1030 may exist in one header file 1050. Instead of existing for each of the plurality of media data 1010 through 1030, the header files may exist as one header file 1050 and may be included in information 1044 required to access the plurality of media data 1010 through 1030.

For example, when each of the plurality of media data 1010 through 1030 corresponds to an elementary stream, e.g., an elementary stream according to the MPEG-2 standard, each of the header files of the plurality of media data 1010 through 1030 may be the header file 1050 including a program association table (PAT) and a program map table (PMT). At least one of the PAT and the PMT may be separated from the plurality of media data 1010 through 1030 to prepare the header file 1050, and the media presentation description may include information pointing to the header file 1050. The information pointing to the header file 1050 may be URL information of the header file 1050 or information for specifying a packet including the header file 1050 in a MPEG-2 transport stream (TS). The header file 1050 including at least one of the PAT and the PMT is an initialization segment, and may be transmitted to the client 130 before segments including payload data, so as to initiate reproduction of the plurality of media data 1010 through 1030.

Referring back to operation 532 of FIG. 5B, the client 130 may obtain the information pointing to the header file 1050 by referring to the media presentation description, and may request the header file 1050 based on the information pointing the header file 1050. After requesting and receiving the header file 1050 based on the information pointing to the header file 1050, at least one of the plurality of media data 1010 through 1030 is selected based on at least one of the PAT and the PMT included in the header file 1050, and the selected at least one media data is requested from the server 120. The PAT and the PMT may be separated as the header file 1050 or included in the plurality of media data 1010 through 1030, but may include an entire list of elementary streams included in the plurality of media data 1010 through 1030 regardless of locations of the PAT and the PMT.

According to MPEG-2, packet IDs (PIDs) defined in the PAT and the PMT are different according to elementary streams. Accordingly, PIDs assigned to each of the plurality of media data 1010 through 1030 may be different. Alternatively, according to another exemplary embodiment, since the plurality of media data 1010 through 1030, generated by encoding one content to have different qualities, are elementary streams of the same content, the same PID may be employed.

When the plurality of media data 1010 through 1030 correspond to a plurality of elementary streams according to MPEG-2, each of segments included in the plurality of media data 1010 through 1030 may include at least one continuous packetized elementary stream (PES). However, one PES may be included in only one segment from among the segments. In other words, one PES may not be included in two different segments.

Since a plurality of media data are generated by encoding one content to have different qualities, presentation time stamps (PTSs) and/or decoding time stamps (DTSs) included in PESs of the plurality of media data may be aligned according to reproduction times. In other words, if an initial PES of first media data and an initial PES of second media data are content reproduced at the same time, a PTS and/or a DTS may be equally set.

Further, when the second media data is reproduced while reproducing the first media data by changing media data according to the streaming environment, the PTSs and/or the DTSs may be continuously aligned so that the first and second media data are continuously reproduced. In other words, when the second media data is reproduced while reproducing the first media data, by changing media data, the PTS and/or the DTS of the last PES before the changing of the media data, and the PTS and/or the DTS of the first PES after the changing of the media data, may be continuously set.

The PTS and/or the DTS define a time stamp of video data. Accordingly, time stamps of the plurality of media data with respect to video data are aligned according to the reproduction times of the plurality of media data as described above. Such alignment of the time stamps based on the reproduction times may be equally applied to audio data. In other words, like the time stamps of the plurality of media data with respect to the video data, time stamps of the pieces media data with respect to the audio data may also be aligned according to the reproduction times for adaptive streaming.

Figure 11A:
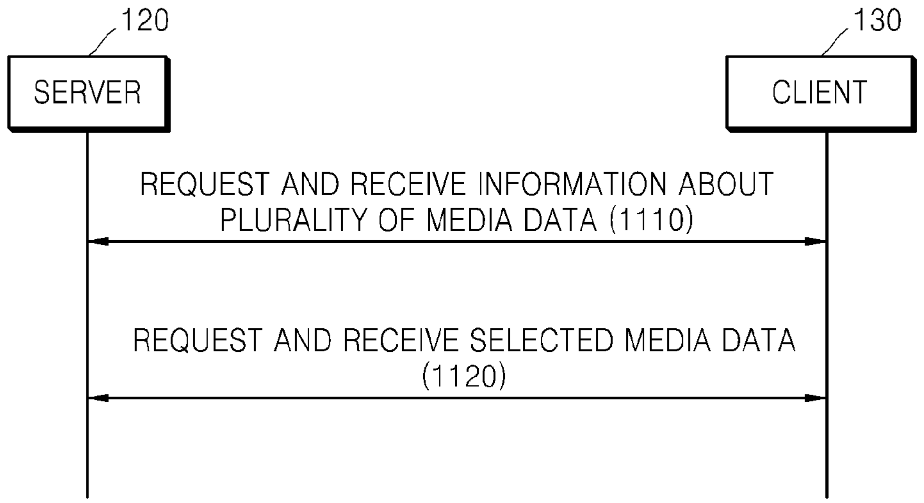
FIGS. 11A and 11B are flowcharts for describing streaming methods according to exemplary embodiments.

FIG. 11A is a flowchart for describing a streaming method according to another exemplary embodiment.

Referring to FIG. 11A, the client 130 requests information about a plurality of media data to the server 120, in operation 1110. The client 130 may request a media presentation description from the server 120 via an HTTP request, and may receive the media presentation description as an HTTP response. The client 130 requests the server 120 for and receives the information about the plurality of media data generated by encoding one content to have a plurality of different qualities, so as to perform streaming that is adaptive to a streaming environment. The streaming method of FIG. 11A is different from the streaming method of FIG. 5A as the information about the plurality of media data is requested and received without requesting and receiving information about content.

In operation 1120, the client 130 requests the server 120 to transmit at least one of the plurality of media data. The client 130 selects and requests at least one media data that is encoded to have a quality suitable for the streaming environment by referring to the information about the plurality of media data, and receives the requested at least one media data from the server 120.

Figure 11B:
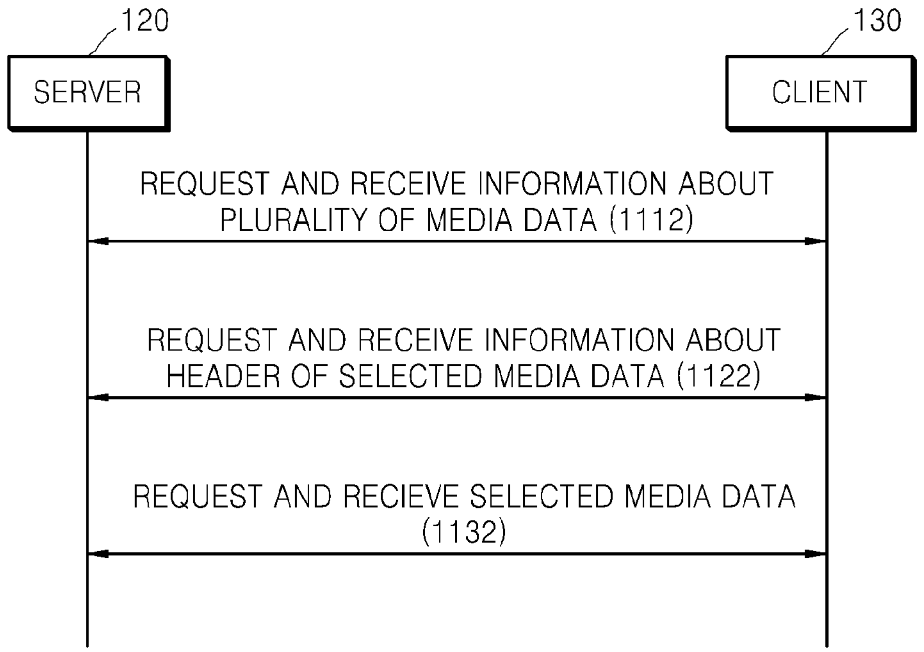

FIG. 11B is a flowchart for describing a streaming method according to another exemplary embodiment.

Referring to FIG. 11B, the client 130 requests the server 120 to transmit information about a plurality of media data and receives the information about the plurality of media data from the server 120 in response to the request, in operation 1112. The client 130 may request the server 120 for a media presentation description through an HTTP request, and receive the media presentation description as an HTTP response.

In operation 1122, the client 130 requests a header of selected media data based on the information about the plurality of media data received in operation 1112. The client 130 requests the header of media data selected according to a streaming environment by referring to the information about the plurality of media data received in operation 1112. In response to the request, the server 120 transmits a file including the header of the selected media data to the client 130.

In operation 1132, the client 130 requests the server 120 to transmit the media data selected based on the information about the plurality of media data received in operation 1112, and the header received in operation 1122. The client 130 requests the server 120 to transmit at least one segment generated by encoding content in a predetermined quality and dividing the encoded content based on time, and the server 120 transmits the requested at least one segment to the client 130.

Figure 12A:
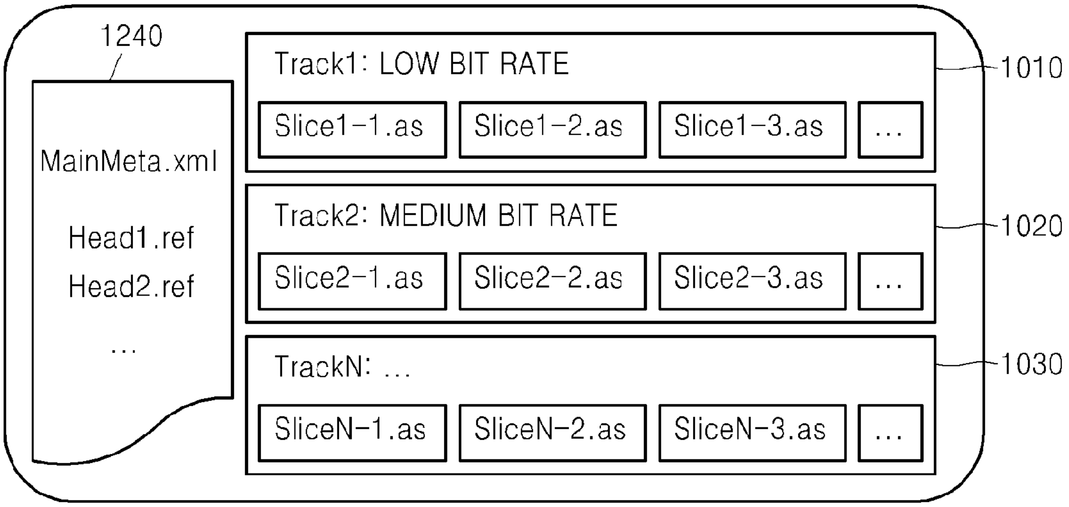
FIGS. 12A, 12B and 12C each illustrate a plurality of media data according to exemplary embodiments.
Figure 12B:
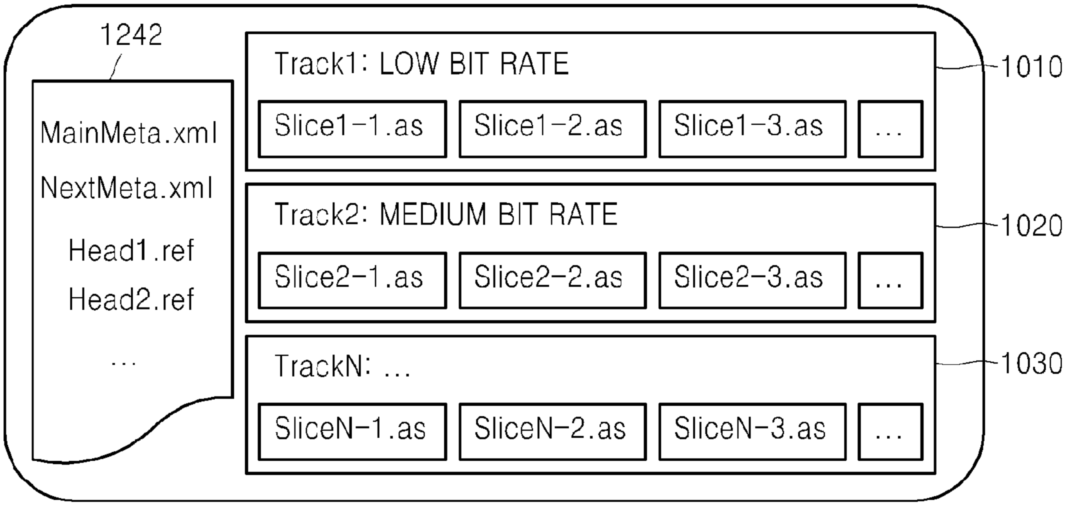

FIGS. 12A, 12 B and 12C each illustrate a plurality of media data according to other exemplary embodiments. FIGS. 12A and 12B each illustrate the plurality of media data included in the server 120, which are used to perform the streaming methods of FIGS. 11A and 11B.

Referring to FIG. 12A, the server 120 may include the plurality of media data 1010 through 1030 generated by encoding one content to have the plurality of different qualities for streaming that is adaptive to a streaming environment, as shown in FIG. 10A.

Here, the plurality of media data 1010 through 1030 of FIG. 12A is different from the plurality of media data 1010 through 1030 of FIG. 10A in information 1240 required for the client 130 to access the plurality of media data 1010 through 1030, wherein the server 120 only includes information about the plurality of media data 1010 through 1030 and not information about content, unlike the exemplary embodiment of FIG. 10A. Here, the client 130 may receive the information about content from another entity instead of the server 120, and access the plurality of media data 1010 through 1030 included in the server 120 based on the received information about content.

Referring to FIG. 12B, information 1242 required for the client 130 to access the plurality of media data 1010 through 1030 may be prepared by further including a "NextMeta.xml" file to the information 1240 of FIG. 12A.

Figure 12C:
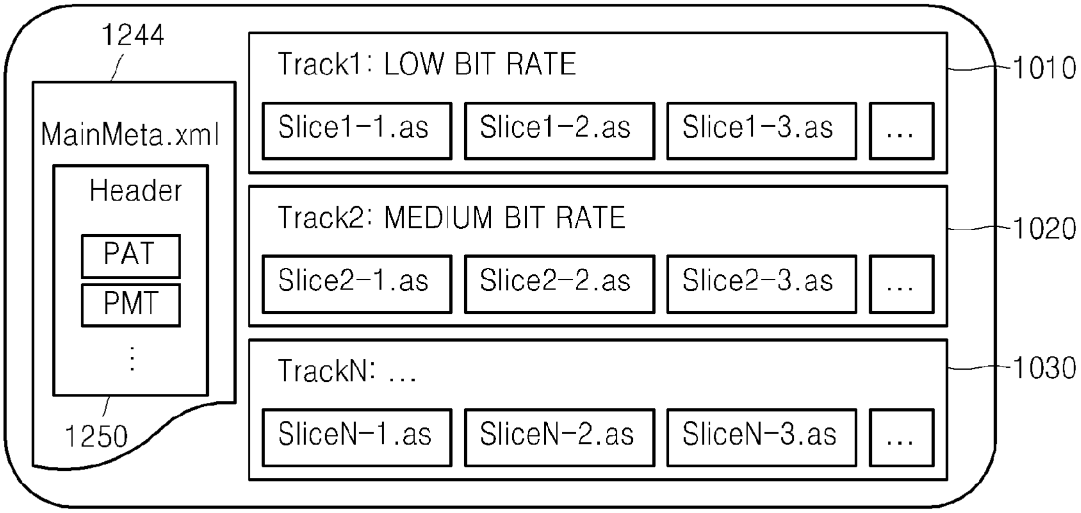

Referring to FIG. 12C, the header files of the plurality of media data 1010 through 1030 may exist in one header file 1250. The header files do not exist for each of the plurality of media data 1010 through 1030, but may be included in information 1244 required to access the plurality of media data 1010 through 1030, as one header file 1250. The header file 1250 corresponds to the header file 1050 of FIG. 10C.

Figure 13A:
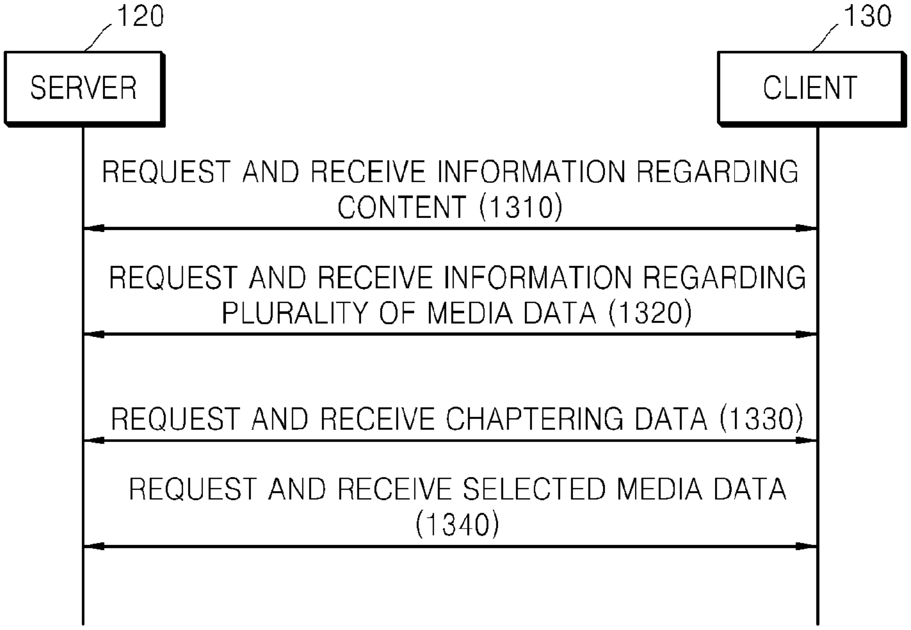
FIGS. 13A and 13B are flowcharts illustrating streaming methods according to exemplary embodiments.

FIG. 13A is a flowchart illustrating a streaming method according to another embodiment. Referring to FIG. 13A, in operation 1310, a client 130 requests a server 120 to provide information regarding desired content, and receives the information regarding the desired content from the server 120. For this end, the client 130 may transmit an HTTP request for the information regarding the desired content to the server 120 and receive the information regarding the desired content from the server 120 according to the HTTP response. An XML file containing the information regarding the desired content may be received. The information regarding the desired content may include the URL of a media presentation description as described above in detail with reference to FIGS. 6 and 7.

In operation 1320, the client 130 requests the server 120 to provide information regarding a plurality of media data, based on the information regarding the desired content received in operation 1310. The client 130 may transmit an HTTP request for a media presentation description to the server 120 and receive the media presentation description from the server 120 according to the HTTP response.

The media presentation description that the client 130 receives in operation 1320 may be one of the media presentation descriptions described above in detail with reference to FIGS. 8A, 8B, and 9A to 9G and may contain information regarding a plurality of chapters of the content. The plurality of chapters of the content will now be described in detail with reference to FIGS. 14A to 14H.

FIGS. 14A through 14H illustrate media presentation descriptions according to other embodiments. Referring to FIG. 14A, a media presentation description according to another embodiment includes "Period" tags that are subject to a "MPD" tag (an uppermost tag) and identify reproduction periods of content that is being streamed, respectively. Each of the "Period" tags includes an "Representation" tag having information regarding a plurality of media data that are to be streamed in a corresponding reproduction period. Also, each of the "Representation" tags may include a "SegmenInfo" tag having information regarding a plurality of segments divided from one media data according to time.

The media presentation description further includes a "Chaptering" tag having information regarding a plurality of chapters of the content that is being streamed. The content may include the plurality of chapters classified according to a scene, a story, or time. The information regarding the plurality of chapters is defined with the "Chaptering" tag. Information regarding at least one of a still image and texts related to a particular chapter may be information regarding the chapter.

The "Chaptering" tag may include at least one attribute defining a still image corresponding to the plurality of chapters. The format, URL, and time intervals of at least one still image are defined with a "mimeType" attribute, a "URL" attribute, and an "ImageInterval" attribute. The resolution of the at least one still image is defined with a "height" attribute and a "width" attribute. The "height" attribute and the "width" attribute define the horizontal and vertical sizes of the at least one still image, i.e., the resolution of the at least one still image. Also, a compression type of the at least one still image is defined with a "compressiontype" attribute.

The "URL" attribute of the "Chaptering" tag may be a template, similar to the "URL" attribute of the media presentation description described above. The template is a common part of the URLs of a plurality of still images and may be defined with the "URL" attribute.

Referring to FIG. 14B, the name of a tag including information a plurality of chapters of content may be the same as that of a tag defining a plurality of media data. In other words, the tag defining a plurality of media data, i.e., a "Representation" tag, may be used to define the plurality of chapters. Thus, each of "Period" tags defining reproduction periods, respectively, may include a "Representation" tag defining media data in a corresponding reproduction period, and a "Representation" tag defining a plurality of chapters in the corresponding reproduction period.

Referring to FIG. 14B, in a first "Period" tag, a first "Representation" tag is used to define media data, e.g., video data, and a second "Representation" tag is used to define a plurality of chapters. The second "Representation" tag defines the "mimeType" attribute, the "width" attribute, the "height" attribute, and the "ImageInterval" attribute described above with reference to FIG. 14A so as to define a plurality of still images corresponding to the plurality of chapters.

As described above with reference to FIG. 14A, each of the "Representation" tags may include the "SegmentInfo" tag that is a lower tag defining a plurality of segments of the media data. Likewise, a "SegmentInfo" of the "Representation" tag of FIG. 14B, which defines the plurality of chapters, may define a plurality of segments divided from a plurality of still images according to a predetermined criterion. The plurality of still images may be divided into a plurality of segments according to data size or time, and the plurality of segments may be defined. As illustrated in FIG. 14B, each of the "SegmentInfo" tags defining the plurality of segments, respectively, may include "Url" tags subject thereto, and each of the "URL" tags may define the URL of a corresponding still image.

FIG. 14C illustrates a case where a "Representation" tag defining a plurality of chapters does not include the "imageInterval" attribute. As described above, the plurality of chapters may be classified according a scene, or a story other than time. In this case, time intervals between still images may not be uniform. Thus, as illustrated in FIG. 14C, the "Representation" tag may not include the "imageInterval" attribute, and may define an "ImagePresentationTime" attribute in an "Url" tag included in a "SegmentInfo" tag subject to the "Representation" tag. The "ImagePresentationTime" attribute defines time corresponding to a still image.

FIG. 14D illustrates a case where a plurality of still images corresponding to a plurality of chapters and time information corresponding to the plurality of still images are included in one file. Referring to FIG. 14D, a "chaptering.mp4" file includes not only a plurality of still images corresponding to a plurality of chapters but also time information of each of the still images generated. The "chaptering.mp4" file may have a structure as will be later described with reference to FIG. 17 or may be generated in an ISO Base Media File Format (ISOBMFF).

A language based on which the "chaptering.mp4" file is generated is defined with a "lang" attribute, and a method of reproducing information regarding the plurality of chapters based on the "chaptering.mp4" file is defined with a "contentviewpoint" attribute. If the "contentviewpoint" attribute is defined as "navigation", then a plurality of still images included in the "chaptering.mp4" file are reproduced at a predetermined speed so that a user may select a still image corresponding to a desired point of time from among the plurality of still images. Otherwise, the plurality of still images included in the "chaptering.mp4" file may be displayed in a scrolling manner so that a user may select a still image among the plurality of still images that are scrolled. A "mimeType" attribute defines the format of the chaptering.mp4" file including the plurality of still images. If the format of the "chaptering.mp4" file is "mp4", then the "mimeType" attribute is defined as "jpeg/mp4" since the "chaptering.mp4" file includes the plurality of still image.

FIG. 14E illustrates a case where a plurality of files are generated, including information regarding a plurality of chapters, according to an embodiment. Location information of the plurality of files is defined with a "sourceURL" attribute included in a "Url" tag.

As described above, one media data may be divided into a plurality of segments according to time. In this case, a file containing information regarding chapters corresponding to the plurality of segments may be as illustrated in FIG. 14E. For example, from among the plurality of segments, still images belonging to a plurality of chapters included in a first segment may be included in a "seg-1.mp4" file, and still images belonging to a plurality of chapters included in a second segment reproduced after the first segment may be included in a "seg-2.mp4" file. A "mimeType" attribute and a "contentviewpoint" attribute are as described above with reference to FIG. 14D.

FIG. 14F illustrates a case where times corresponding to the plurality of files of FIG. 14E, respectively, are specified, according to an embodiment. Referring to FIG. 14F, the times corresponding to the files that include information regarding a plurality of chapters, respectively, are defined with an "imagePresentationTime" attribute. Referring to FIG. 14F, chapter information regarding media data from "00:00:00" to "00:20:00" is included in a "seg-1.mp4" file, and chapter information regarding media data from "00:20:00" to "00:40:00" is included in a "seg-2.mp4" file. If the files including the information regarding the plurality of chapters correspond to a plurality of media data corresponding to different times, respectively, and times covered by the files are not periodic, then the "imagePresentationTime" attribute may be used to define the starting times of the files, respectively, as illustrated in FIG. 14F.

FIG. 14G illustrates a case where information regarding a plurality of chapters is included in one file. Compared to the case of FIG. 14D, a "Representation" tag defining a plurality of media data is used to define a plurality of chapters, instead of a separate tag representing chapter information. When the size of the information regarding the plurality of chapters is not large and there is no need to generate a plurality of files, unlike in FIGS. 14E and 14F, the information regarding the plurality of chapters may be completely included in one file and the file may be defined using the "Representation" tag.

FIG. 14H illustrates a case where each of the "Url" tags of FIG. 14C includes attributes defining a language, a title, and a description regarding a corresponding chapter, according to an embodiment. The title and description of a still image corresponding to each of a plurality of chapters are defined with a "title" attribute and a "description" attribute, respectively. The "title" attribute and the "description" attribute of each language defined by a "lang" attribute may be defined. If a "contentviewpoint" attribute is defined as 'chapter' unlike in FIGS. 14D to 14G, then still images corresponding to the plurality of chapters are displayed in a thumbnail manner and a user may select one of the displayed still images.

Figure 15A:
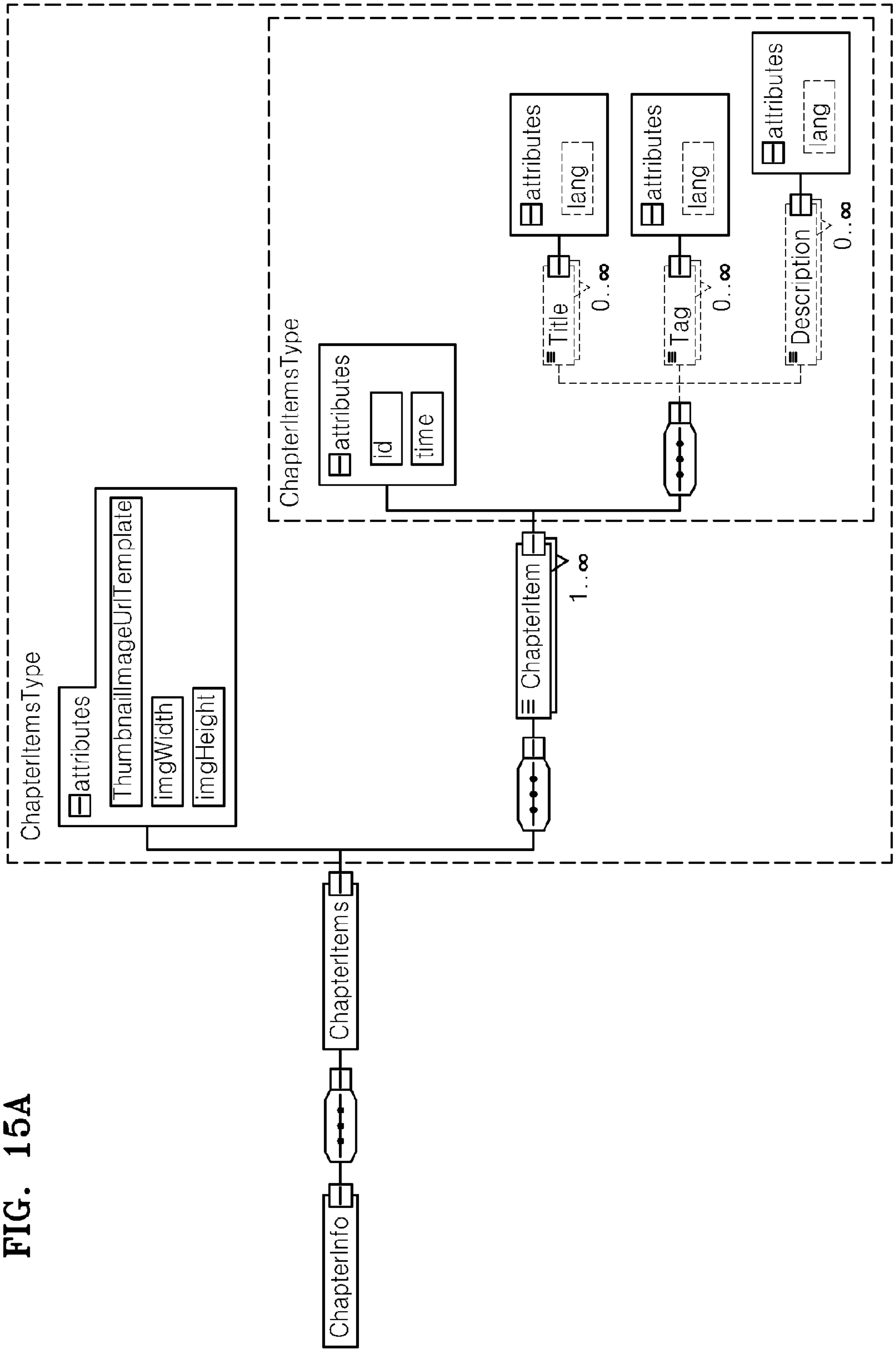

FIGS. 15A and 15B illustrate schemas of a chapter according to exemplary embodiments. FIG. 16 illustrates information regarding a chapter according to the schemas of FIGS. 15A and 15B, according to an embodiment.

Referring to FIGS. 15A and 15B, information regarding a plurality of chapters included in a media presentation description may be produced according to the schemas illustrated in FIGS. 15A and 15B. Specifically, referring to FIG. 16, a plurality of chapters of content may be defined with a "ChapterItems" tag and a "ChapterItem" tag included in a "ChapterInfo" tag.

The "ChapterItem" tag defines a plurality of still images corresponding to the plurality of chapters. An identifier and time corresponding to each of the still images are defined with an "id" attribute and a "time" attribute, respectively. The title and description of each of the chapters are defined as a "title" tag and a "Description" tag which are lower tags, respectively. A brief description of each of the chapter is defined with a "Tag" tag. The "title" tag, the "Description" tag, and the "Tag" tag are defined in a string, and the total number of strings is not limited. A "lang" attribute defines a language used in each of the "title", "Tag", and "Description" tags. Referring to FIG. 15A, the "lang" attribute may be subject to each of the "title", "Tag", and "Description" tags or may be on a same level as the "title", "Tag", and "Description" tags. If the same language is used in the "title", "Tag", and "Description" and the tags are the same, then the "lang" attribute does not need to be subject to the "title", "Tag", and "Description" tags, and may on the same level as the "title", "Tag", and "Description" tags and define a language used in "title", "Tag", and "Description" tags.

The "ChapterItems" tag includes a plurality of "ChapterItem" tags, and define the resolutions of the still images by using an "imgWidth" attribute and an "imgHeight" attribute. A common part of the URLS of the still images is defined with a "ThumbnailImgUrlTemplate" attribute. The URL of a still image may be determined by using the identifier of the still image defined in the "id" attribute of the "ChapterItem" tag, instead of a "$ID$" of a URL template defined with the "ThumbnailImgUrlTemplate" attribute.

The media presentation description received in operation 1320 may include a tag defining a plurality of media data and a tag including information regarding a plurality of chapters as illustrated in FIG. 16. Also, an additional XML file produced according to the schemas of FIGS. 15A and 15B may be transmitted or received separately from the media presentation description, in operation 1320. In other words, the client 130 may request the server 120 to provide an XML file produced separately from the media presentation description to include the information regarding the plurality of chapters according to the schemas of FIGS. 15A and 15B, and the server 120 may transmit the XML file to the client 130.

Referring back to FIG. 13A, in operation 1330, the client 130 requests the server 120 provide chaptering data, and receives the chaptering data from the server 120. The chaptering data may be data regarding still images corresponding to a plurality of chapters of content that is being streamed. The client 130 may transmit an HTTP request for the chaptering data to the server 120, and receive the chaptering data as a HTTP response.

The media presentation description received in operation 1320 includes the URLs of the still images corresponding to the plurality of chapters as described above. The client 130 requests the server 120 to provide the chaptering data based on the URLs, and receive the chaptering data as a reply to the request. The chaptering data may include data regarding the still images corresponding to the plurality of chapters of the content. The chaptering data will now be descried in detail with reference to FIG. 17.

Figure 17:
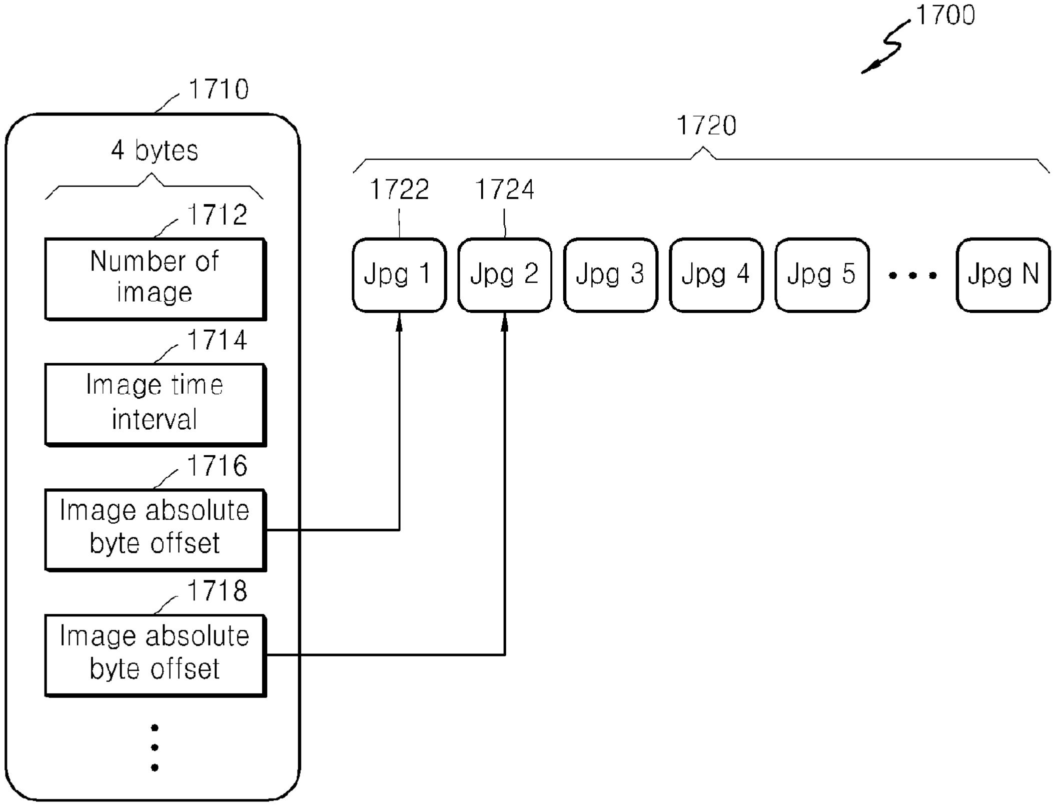
FIG. 17 is a diagram illustrates the structure of chaptering data, according to an embodiment.

FIG. 17 is a diagram illustrating the structure of chaptering data 1700 according to an embodiment. Referring to FIG. 17, the chaptering data 1700, such as chaptering data received in operation 1330, includes a header 1710 and a plurality of still image data 1720. The header 1710 includes still image number information 1712, still image time interval information 1714, and still image data offset information 1716 and 1718 included in the chaptering data 1700. The still image number information 1712 defines the total number of still images included in the chaptering data 1700. The still image time interval information 1714 defines time intervals between the still images.

The still image data offset information 1716 and 1718 define offsets for specifying still images 1722 and 724 from among the plurality of still image data 1720, respectively. The first still image 1722, i.e., "Jpg 1", is defined by the first still image data offset information 1716, and the second still image, i.e., "Jpg 2", is defined by the second still image data offset information 1718. An absolute data interval between the start of the plurality of still image data 1720 and specified still image data may be defined with an offset.

Referring back to FIG. 13A, in operation 1340, the client 130 receiving the chaptering data in operation 1330 requests the server 120 to transmit at least one media data from among the plurality of media data. The client 130 may select at least one media data encoded to have a quality sufficient for a current streaming environment from among the plurality of media data, based on the information regarding the plurality of media data, and then requests the server 120 to transmit the selected media data. Also, the client 130 may transmit an HTTP request for predetermined media data to the server 120. Then the server 120 transmits the at least one media data to the client 130 in response to the request. The server 120 may encode the content to have a predetermined quality, divides the encoded content into several segments according to time, and transmit at least one of the segments to the client 120. The server 120 may transmit the predetermined media data to the client 130 as a HTTP response.

As described above with reference to FIGS. 5B and 11B, a header of at least one media data selected adaptively to a streaming environment is first received and then the at least one media data may be received.

If the client 130 selects a particular chapter based on the chaptering data received in operation 1330, at least one media data encoded to have a quality sufficient for the streaming environment is received, starting from the selected chapter. If the still images included in the chaptering data are displayed on a display device (not shown) of the client 130 and a user selects a particular chapter, then data streaming may be performed starting from the selected chapter. If a user of the client 130 selects a particular chapter based on the chaptering data during streaming of the content, the client 130 may receive at least one media data, starting from the selected chapter.

Figure 13B:
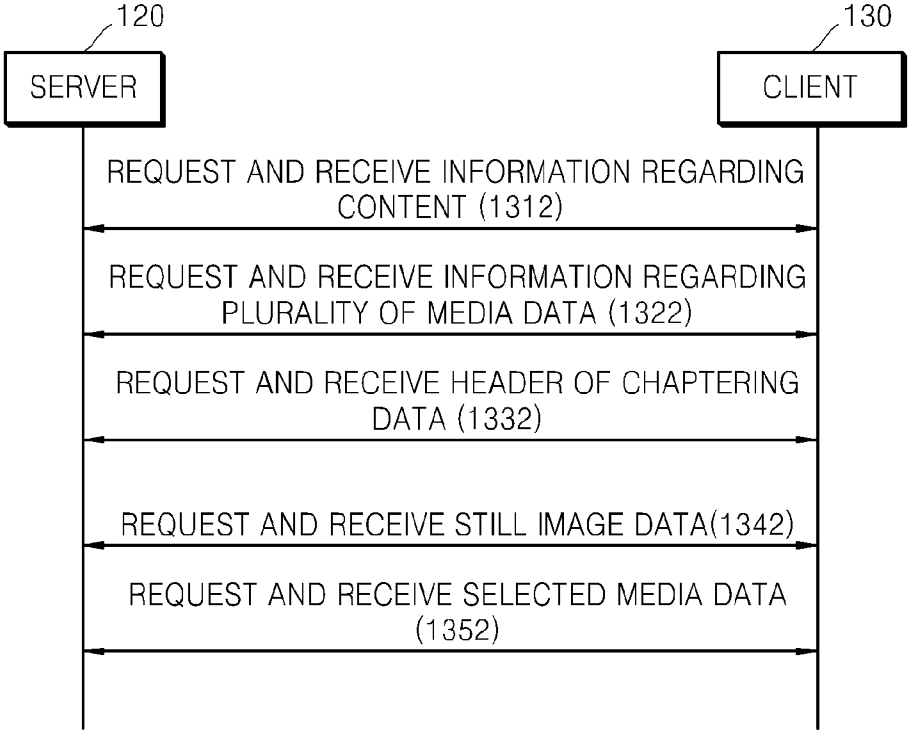

FIG. 13B is a flowchart illustrating a streaming method according to another embodiment. In FIG. 13B, operations 1312 and 1322 correspond to operations 1310 and 1320 of FIG. 13A, respectively. In operation 1312, the client 130 requests the server 120 to provide information regarding content, and receives the information regarding the content, which includes the URL of a media presentation description, from the server 120. In operation 1322, the client 130 requests the server 120 provide a media presentation description including information regarding a plurality of chapters, based on the information regarding content received in operation 1312, and then receives the media presentation description from the server 120.

In operations 1332 and 1342, the client 130 receives the chaptering data based on the information regarding the plurality of media data received in operation 1322, i.e., the information regarding the plurality of chapters included in the media presentation description.

Specifically, in operation 1332, the client 130 may request the server 120 to provide a header of the chaptering data, and receive the header of the chaptering data from the server 120. As described above with reference to FIG. 17, the chaptering data 1700 may include the header 1710 and the plurality of still image data 1720. In operation 1332, the client 130 may request the server 120 to provide the header 1710 of the chaptering data 1700, and receive the header 1710 from the server 120. Since the header 1710 includes the still image number information 1712, the still image time interval information 1714, and the still image data offset information 1714 and 1716, the client 130 may request and receive the plurality of still image data 1720, based on the header 1710, in operation 1342.

In FIG. 13B, operation 1352 corresponds to operation 1340 of FIG. 13A. In operation 1352, the client 130 requests the server 120 to transmit at least one media data from among the plurality of media data, and receives the at least one media data from the server 120. In this case, when a user of the client 130 selects a particular chapter based on the chaptering data received in operations 1332 and 1342, the client 130 may receive at least one media data, starting from the selected chapter.

Figure 18A:
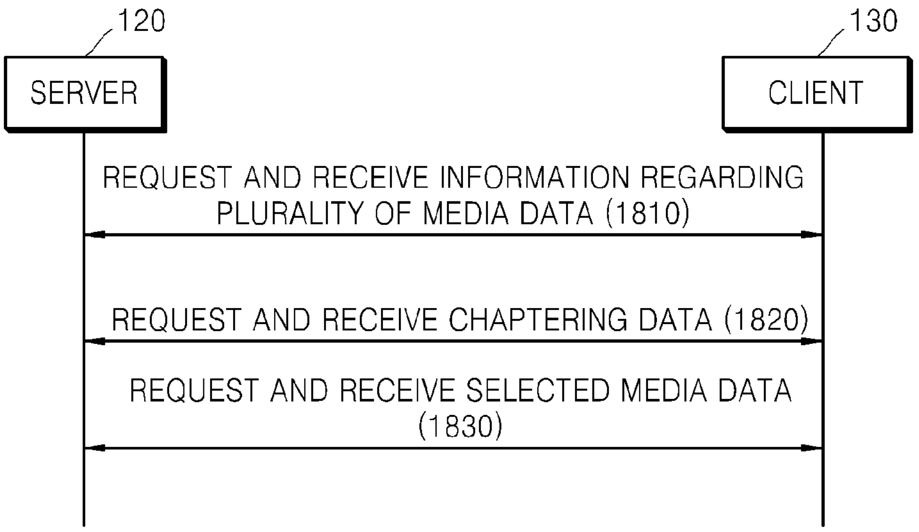
FIGS. 18A and 18B are flowcharts illustrating streaming methods according to other embodiments.

FIG. 18A is a flowchart illustrating a streaming method according to another embodiment. Referring to FIG. 18A, in operation 1810, the client 130 requests the server 120 to transmit information regarding a plurality of media data. The client 130 may transmit an HTTP request for a media presentation description to the server 120, and receive the media presentation description from the server 120 as a HTTP response. The streaming method of FIG. 18A is different from the streaming method of FIG. 13A in that the information regarding the plurality of media data is requested and received without requesting and receiving information regarding content. The media presentation description received in operation 1810 may be the media presentation descriptions illustrated in FIGS. 14A to 14H.

In operation 1820, the client 130 requests the server 120 to transmit chaptering data, and receives the chaptering data from the server 120. The chaptering data may be received based on the information regarding the plurality of chapters included in the media presentation description received in operation 1810.

In operation 1830, the client 130 requests the server 120 to transmit at least one media data from among the plurality of media data. The client 130 may select at least one media data encoded to have a quality sufficient for a streaming environment from among the plurality of media data, based on the information regarding the plurality of media data, request the server 120 to transmit the at least one media data, and then receive the at least one media data from the server 120. If a particular chapter is selected based on the chaptering data received in operation 1820, at least one media data may be requested and received, starting from the selected chapter.

As described above with reference to FIGS. 5B and 11B, a header of at least one media data selected adaptively to a streaming environment may first be received and the at least one media data may then be received.

Figure 18B:
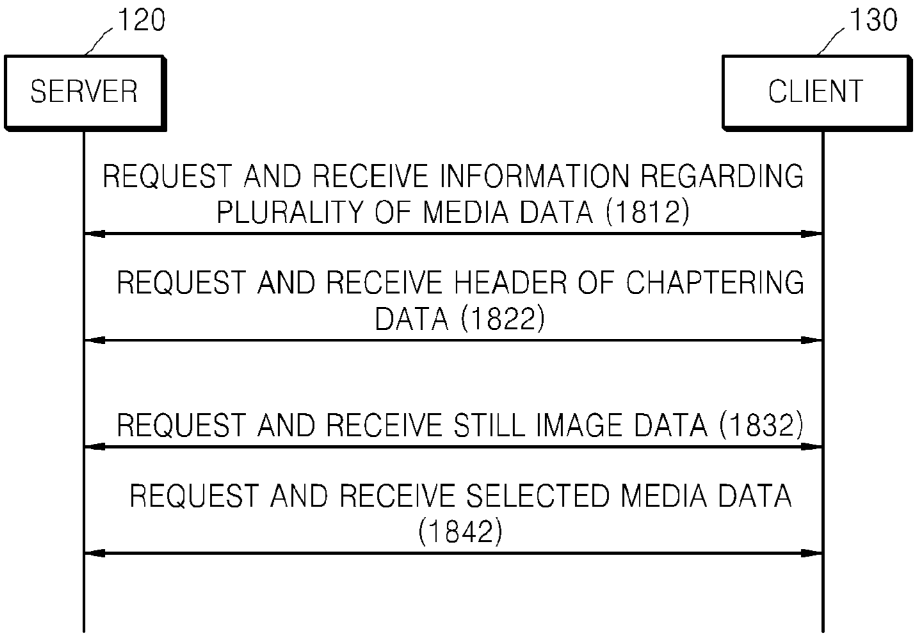

FIG. 18B is a flowchart illustrating a streaming method according to another embodiment. In FIG. 18B, operation 1812 corresponds to operation 1810 of FIG. 18A. In operation 1812, the client 130 requests the server 120 to transmit information regarding a plurality of media data. The client 130 may transmit an HTTP request for a media presentation description to the server 120 and receive the media presentation description from the server 120 as HTTP response. The streaming method of FIG. 18B is different from the streaming method of FIG. 13B in that the information regarding the plurality of media data is requested and received without requesting and receiving information regarding content. The media presentation description received in operation 1812 may be the media presentation descriptions illustrated in FIGS. 14A to 14H.

In operation 1822, the client 130 may request the server 120 to transmit a header of chaptering data and receive the header of chaptering data from the server 120. In operation 1822, the client 130 may first request the server 120 to transmit the header 1710 of the chaptering data 1700 of FIG. 17 and receive the header 1710 from the server 120. After the client receives the header 1710 in operation 1822, the client may request and receive the plurality of still image data 1720 based on the header 1710, in operation 1832.

Operation 1842 corresponds to operation 1830 of FIG. 18A. In operation 1842, the client 130 requests the server 120 to transmit at least one media data from among the plurality of media data, based on the chaptering data received in operations 1822 and 1832, and receives the at least one media data from the server 120. If a particular chapter is selected based on the chaptering data received in operations 1822 and 1832, at least one media data may be requested and received, starting from the selected chapter.

Figure 19:
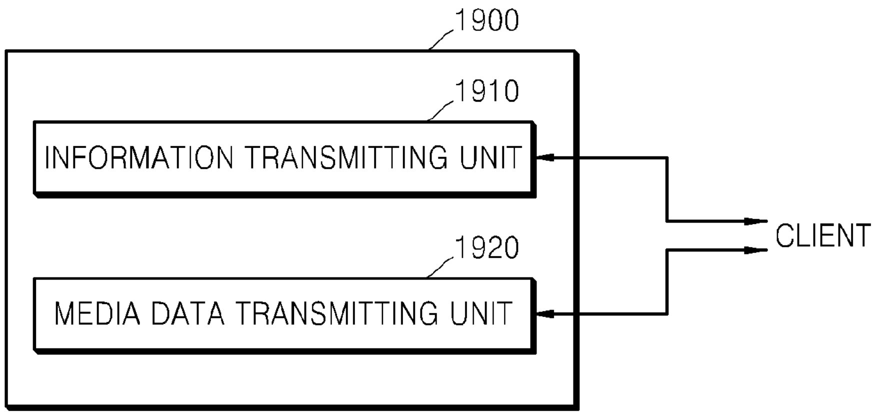
FIG. 19 is a block diagram of a media data transmitting apparatus that may be included in the server of FIG. 1, according to an embodiment.

FIG. 19 is a block diagram of a media data transmitting apparatus 1900 that may be included in the server 120 of FIG. 1, according to an embodiment. Referring to FIG. 19, the media data transmitting apparatus 1900 includes an information transmission or transmitting unit 1910 and a media data transmission or transmitting unit 1920.

The information transmission unit 1910 receives a request for predetermined information from the client 130 and transmits the requested information to the client 130. The information transmission unit 1910 may receive a request for at least one piece from among information regarding content and information regarding a plurality of media data from the client 130, and transmit the requested information to the client 130. The information transmission unit 1910 may receive an HTTP request for at least one from among the information regarding the content and the information regarding the plurality of media data from the client 130, and transmit the requested information to the client 130 as HTTP response.

The information regarding the plurality of media data that the information transmission unit 1910 transmits to the client 130 may be a media presentation description. The media presentation description may be as described above with reference to FIGS. 9A to 9H and 14A to 14H. Thus, as described above with reference to FIGS. 14A to 14H, the media presentation description may include information regarding a plurality of chapters of content that is being streamed.

The media data transmission unit 1920 receives a request for at least one media data, which is selected adaptively to a streaming environment from among the plurality of media data, from the client 130, and transmits the requested media data to the client 130. The media data transmission unit 1920 may receive a request for at least one media data, which is selected based on the media presentation description that the information transmission unit 1910 transmits to the client 130, from the client 130. The server 120 may receive a plurality of media data, which are encoded to have different qualities, respectively, from the encoding device 110, store the plurality of media data, and transmit at least one media data requested to the client 130 from among the stored media data. Otherwise, the server 120 may receive media data from the encoding device 110 and transmit the media data to the client 130 in real time, in response to a request from the client 130.

As described above with reference to FIGS. 13A, 13B, 18A, and 18B, the client 130 may request chaptering data based on the media presentation description that includes the information regarding the plurality of chapters. Then, the media data transmission unit 1920 may transmit the chaptering data to the client 130. When the client 130 requests at least one media data corresponding to a particular chapter, based on the chaptering data, the media data transmission unit 1920 may transmit at least one media data to the client 130, starting from the particular chapter.

The client 130 may select a chapter during streaming of content, and in this case, the streaming is stopped and at least one media data is transmitted to the client 130, starting from the selected chapter.

The media data transmission unit 1920 may transmit the entire chaptering data to the client 130 at a time, as illustrated in FIGS. 13A and 18A, or may first transmit a header of the chaptering data and then transmit still image data as illustrated in FIGS. 13B and 18B.

Figure 20:
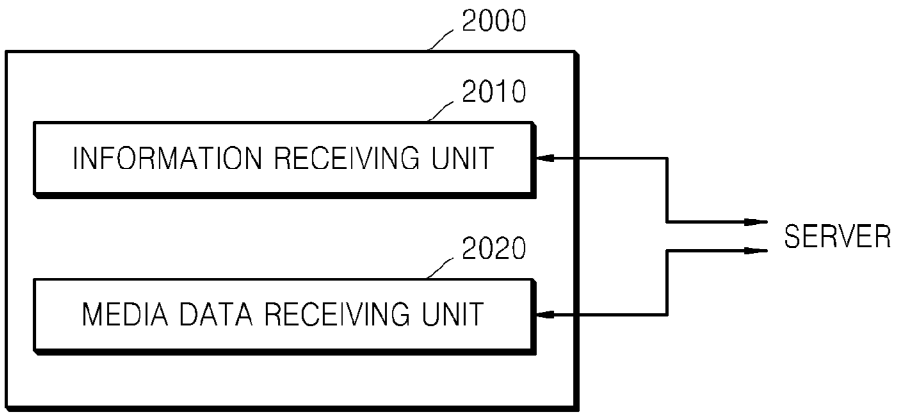
FIG. 20 is a diagram of a media data receiving apparatus that may be included in the client of FIG. 1, according to an embodiment.

FIG. 20 is a diagram of a media data receiving apparatus 2000 that may be included in the client 1300 of FIG. 1, according to an embodiment. Referring to FIG. 20, the media data receiving apparatus 2000 of the client 130 includes an information receiving unit 2010 and a media data receiving unit 2020.

The information receiving unit 2010 transmits a request for desired information to the server 120, and receives the requested information from the server 120. A request for at least one from among information regarding content and information regarding a plurality of media data may be transmitted to the server 120 and may be received from the server 120. According to the embodiment of one of FIGS. 2A, 2B, 5A, 5B, 11A, 11B, 13A, 13B, 18A, and 18B, an HTTP request for at least one from among the information regarding the content and the information regarding the plurality of media data may be transmitted to the server 120 and the at least one information may be received from the server 120 as a reply to the HTTP request.

The information regarding the plurality of media data that the server 120 transmits to the client 130 may be a media presentation description. The media presentation description may be as described above with reference to FIGS. 9A to 9H and 14A to 14H. Accordingly, the media presentation description may include information regarding a plurality of chapters of content that is being streamed, as described above with reference to FIGS. 14A to 14H.

The media data receiving unit 2020 transmits a request for at least one media data selected according to a streaming environment from among the plurality of media data, to the server 120, and receives the requested media data from the client 130. The media data receiving unit 2020 may transmit the request for the selected media data to the server 120, based on the information regarding the plurality of media data that the information receiving unit 2010 receives from the server 120.

The media data receiving unit 2020 may request content sufficient for the streaming environment, based on the media presentation description received from the server 120. The media presentation description includes information regarding the plurality of chapters as described above. Thus, the media data receiving unit 2020 may request and receive chaptering data, based on the media presentation description. The media data receiving unit 2020 may select a chapter based on the chaptering data, and may request the server 120 to provide media data corresponding to the selected chapter server 120. The media data receiving unit 2020 may receive the entire chaptering data from the server 120 at a time as illustrated in FIGS. 13A and 18A, or may first receive a header of the chaptering data and then receive still image data as illustrated in FIGS. 13B and 18B.

According to the above embodiments, it is possible to stream media data regarding content having a plurality of chapters, adaptively according to a streaming environment.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

A system according to an embodiment can also be embodied as computer readable codes on a computer readable recording medium.

For example, a streaming apparatus of a server and a streaming apparatus of a client may include a bus coupled to each unit of the apparatuses 1900 and 2000 of FIGS. 19 and 20, and at least one processor connected to the bus. Also, the streaming apparatuses may further include a memory that is coupled to the bus so as to store a command, a received message, or a generated message and that is coupled to the at least one processor so as to perform commands as described above.

The computer readable recording medium may be any recording apparatus capable of storing data that is read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

What is claimed is:

1. A method of receiving media data in a client, the method comprising:

receiving from a server, a file comprising information regarding a plurality of media data having different qualities, and at least one of information associated with a plurality of a chapters of content, the different qualities of the plurality of media data being generated by encoding data by applying different encoding settings to the same content and dividing the encoded data based on time;

selecting, by the client, first media data from among the plurality of media data based on the received file;

transmitting a request for the first media data; and receiving, from the server, the first media data in response to the request, identifying chapter information based on the received file;

transmitting a request for second media data based on the identified chapter information; and receiving, from the server, the second media data associated with the identified chapter information, wherein, if the second media data having a second quality is requested while the first media data having a first quality, different from the second quality, is transmitted, time stamps of the first media data and the second media data are continuously aligned so that the first media data and the second media data are continuously reproduced.

2. The method of claim 1, wherein the content is divided into the plurality of chapters and the received file further comprises information regarding a plurality of still images corresponding to each of the plurality of chapters of the content, and wherein the receiving of the second media data comprises:

receiving the plurality of still images, based on the received file; and receiving the second media data, starting from a chapter selected based on the plurality of still images.

3. The method of claim 2, wherein the information regarding the plurality of still images comprises a first tag which comprises at least one from among location information, resolution information, and compression type information regarding the plurality of still images.

4. The method of claim 3, wherein the first tag and a second tag that identifies a reproduction period of the content are at a same level.

5. The method of claim 3, wherein the first tag and a third tag that is subject to a second tag that identifies a reproduction period of the content, and that defines a plurality of media data to be reproduced in a predetermined reproduction period are at a same level.

6. The method of claim 3, wherein the first tag further comprises information regarding intervals between the plurality of still images.

7. A non-transitory computer readable recording medium having stored thereon a computer readable program which when executed by a computer performs the method of claim 1.

8. The method of claim 1, wherein the receiving of the first media data comprises:

estimating, by the client, a streaming environment based on at least one of a time stamp and a bit error rate of currently received media data;

selecting, by the client, the first media data that has a quality corresponding to the estimated streaming environment; and receiving, by the client, the selected first media data.

9. The method of claim 1, wherein the content is divided into the plurality of chapters, and wherein, if the second media data is requested while the first media data is transmitted, transmission of the second media data is performed following the first media data, starting from a corresponding chapter.

10. A method of transmitting media data, the method comprising:

transmitting to a client, a file comprising information regarding a plurality of media data generated by encoding content, and at least one of information associated with a plurality of a chapters of the content, the plurality of media data having different qualities, and the different qualities of the plurality of media data being generated by applying different encoding settings to the same content;

receiving, from the client, a request for first media data from among the plurality of media data selected based on the transmitted file;

transmitting the first media data to the client, in response to the request received from the client, receiving, from the client, a request for second media data based on chapter information that is identified based on the transmitted file; and transmitting the second media data associated with the identified chapter information, wherein, if the second media data having a second quality is requested while the first media data having a first quality, different from the second quality, is transmitted, time stamps of the first media data and the second media data are continuously aligned so that the first media data and the second media data are continuously reproduced.

11. The method of claim 10, wherein the content is divided into the plurality of chapters and the transmitted file further comprises information regarding a plurality of still images corresponding to each of the plurality of chapters of the content, and wherein the transmitting of the second media data to the client comprises:

transmitting the plurality of still images to the client, in response to the request based on the transmitted file, received from the client; and transmitting the second media data, starting from a chapter selected by the client based on the plurality of still images.

12. The method of claim 11, wherein the information regarding the plurality of still images comprises a first tag which comprises at least one from among location information, resolution information, and compression type information regarding the plurality of still images.

13. The method of claim 12, wherein the first tag and a second tag that identifies a reproduction period of the content are at a same level.

14. The method of claim 12, wherein the first tag and a third tag that is subject to a second tag, which identifies a reproduction period of the content, and that defines a plurality of media data to be reproduced in a predetermined reproduction period are at a same level.

15. The method of claim 12, wherein the first tag further comprises information regarding intervals between the plurality of still images.

16. A non-transitory computer readable recording medium having stored thereon a computer readable program which when executed by a computer performs the method of claim 10.

17. The method of claim 10, wherein the receiving of the first media data comprises:

estimating, by the client, a streaming environment based on at least one of a time stamp and a bit error rate of currently received media data;

selecting, by the client, the first media data that has a quality corresponding to the estimated streaming environment; and receiving, by the client, the selected first media data.

18. The method of claim 10, wherein the content is divided into the plurality of chapters, and wherein, if the second media data is requested while the first media data is transmitted, transmission of the second media data is performed following the first media data, starting from a corresponding chapter.

19. An apparatus for receiving media data, the apparatus comprising:

an information receiving unit which receives from a server, a file comprising information regarding a plurality of media data generated by encoding content, and at least one of information associated with a plurality of a chapters of the content, the plurality of media data having different qualities, and the different qualities of the plurality of media data being generated by applying different encoding settings to the same content; and a media data transceiving unit which transmits a request for first media data from among the plurality of media data selected based on the received file and a request for second media data based on identified chapter information, and which receives, from the server, the first media data in response to the request for the first media data and the second media data associated with the identified chapter information in response to the request for the second media data, wherein, if the second media data having a second quality is requested while the first media data having a first quality, different from the second quality, is transmitted, time stamps of the first media data and the second media data are continuously aligned so that the first media data and the second media data are continuously reproduced.

20. The apparatus of claim 19, wherein the media data transceiving unit estimates a streaming environment based on at least one of a time stamp and a bit error rate of currently received media data and selects the plurality of the first media data having a quality corresponding to the estimated streaming environment.

21. The apparatus of claim 19, wherein the content is divided into the plurality of chapters, and wherein, if the second media data is requested while the first media data is transmitted, transmission of the second media data is performed following the first media data, starting from a corresponding chapter.

22. An apparatus for transmitting media data, the apparatus comprising:

an information transmitting unit which transmits to a client, a file comprising information regarding a plurality of media data generated by encoding content, and at least one of information associated with a plurality of a chapters of the content, the plurality of media data having different qualities, and the different qualities of the plurality of media data being generated by applying different encoding settings to the same content; and a media data transceiving unit which receives a request for first media data from among the plurality of media data selected based on the transmitted file and a request for second media data based on chapter information that is identified based on the transmitted file, and which transmits, to the client, the first media data in response to the request for the first media data and the second media data associated with the identified chapter information in response to the request for the second media data, wherein, if the second media data having a second quality is requested while the first media data having a first quality, different from the second quality, is transmitted, time stamps of the first media data and the second media data are continuously aligned so that the first media data and the second media data are continuously reproduced.

23. The apparatus of claim 22, wherein the media data transceiving unit estimates a streaming environment based on at least one of a time stamp and a bit error rate of currently received media data and selects the first media data having a quality corresponding to the estimated streaming environment.

24. The apparatus of claim 22, wherein the content is divided into the plurality of chapters, and wherein, if the second media data is requested while the first media data is transmitted, transmission of the second media data is performed following the first media data, starting from a corresponding chapter.

* * * * *